US012583093B2

(12) United States Patent
Lewis

(10) Patent No.: US 12,583,093 B2
(45) Date of Patent: Mar. 24, 2026

(54) PROPPING HANDLE FOR TOOLS AND SIMILAR IMPLEMENTS

(71) Applicant: Richard Lewis, Truxton, NY (US)

(72) Inventor: Richard Lewis, Truxton, NY (US)

( * ) Notice: Subject to any disclaimer, the term of this patent is extended or adjusted under 35 U.S.C. 154(b) by 341 days.

(21) Appl. No.: 18/227,053

(22) Filed: Jul. 27, 2023

(65) Prior Publication Data

US 2024/0075610 A1 Mar. 7, 2024

Related U.S. Application Data

(60) Provisional application No. 63/403,870, filed on Sep. 6, 2022.

(51) Int. Cl.
*B25G 1/08* (2006.01)

(52) U.S. Cl.
CPC .................................... *B25G 1/08* (2013.01)

(58) Field of Classification Search
CPC ... B25G 1/00; B25G 1/01; B25G 1/04; B25G 1/06; B25G 1/08; B25G 1/10; B25G 1/12; B25G 3/00; B25G 3/02; B25G 3/06; B25G 3/10; B25G 3/16; B25G 3/24; B25G 3/26; B25G 3/36; B25F 1/02; B25F 1/04; A01K 97/10; A45F 3/44; E04H 12/22; E04H 12/2215; E04H 12/2284
See application file for complete search history.

(56) References Cited

U.S. PATENT DOCUMENTS 47,265 A * 4/1865 Bugbee .................... A45B 9/04 135/81
248,357 A 10/1881 Silvera
2,241,183 A * 5/1941 Ceder .................... A01K 97/10 43/23
2,414,358 A * 1/1947 Calway .................. A01K 97/10 248/156
2,456,345 A 12/1948 Vale
3,444,934 A 5/1969 Alberto
3,596,966 A * 8/1971 Shredl ...................... A01B 1/16 294/61
4,236,742 A 12/1980 Florence
4,977,914 A * 12/1990 Smerker .............. A61H 3/0288 135/81
6,357,067 B1 3/2002 Jones
6,951,095 B2 10/2005 Cusato
7,686,277 B2 3/2010 Westgarde
7,856,802 B2 12/2010 Thibault et al.
(Continued)

*Primary Examiner* — Robert J Scruggs
(74) *Attorney, Agent, or Firm* — Barclay Damon LLP

(57) ABSTRACT

A handle permits propping of an implement in a substantially vertical orientation within a ground surface includes an elongate handle body and a spike embedded in a gripping end of the elongate handle body, the spike having an exposed axial portion. A compression spring is disposed about the exposed axial portion of the spike and a hollow sleeve is fitted over the compression spring and gripping end. An opening in an upper end of the sleeve permits passage of the exposed portion of the spike. A pin member transversely disposed within the gripping end of the handle body has ends extending into longitudinal slots of the hollow sleeve such that the handle body is movable axially between first and second positions to enable the exposed axial portion of the spike to be advanced through the opening of the hollow sleeve for advancement into the ground surface.

20 Claims, 16 Drawing Sheets

(56) References Cited

U.S. PATENT DOCUMENTS

| | | | | |
|---|---|---|---|---|
| 8,813,862 | B2 * | 8/2014 | Yamaoka ................ | A01B 1/16<br>172/41 |
| 2004/0134179 | A1 | 7/2004 | Cusato | |
| 2006/0278773 | A1 | 12/2006 | Westgarde | |
| 2019/0183025 | A1 | 6/2019 | Muncan et al. | |

* cited by examiner

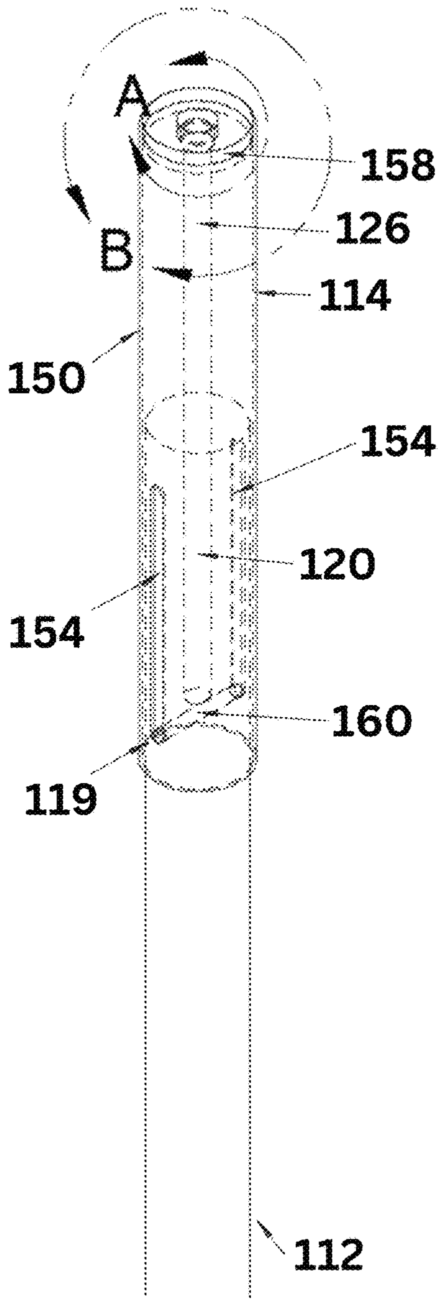
FIG. 4 (a)
FIG. 4 (b)
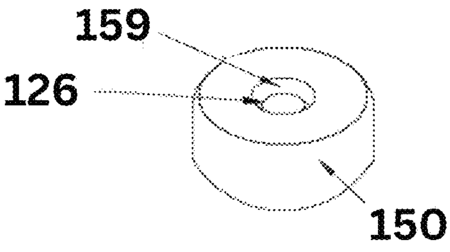
FIG. 4 (c)
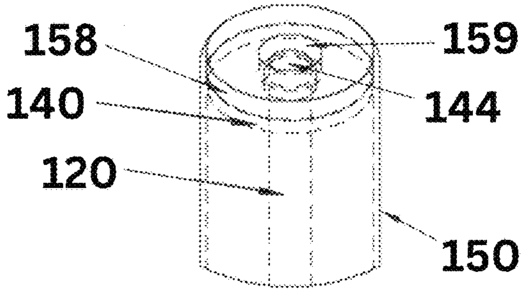

PROPPING HANDLE FOR TOOLS AND SIMILAR IMPLEMENTS

CROSS REFERENCE TO RELATED APPLICATION

This application claims priority to U.S. Ser. No. 63/403,870, filed Sep. 6, 2022, and entitled: Propping Handle. The above document is herein incorporated by reference in its entirety.

TECHNICAL FIELD

The invention is related generally to the field of tools and related implements, and more specifically to a handle for a tool or implement, for example, a garden tool, that permits the implement to be propped in an upright or substantially upright (vertical) orientation when the implement is not in use.

BACKGROUND

Nearly always, a worker using a long-handled tool does not finish the task at hand in a single continuous work session. Rather, for any number of reasons, the worker stops using the tool at one or more times during the completion of the overall task, physically disengaging himself/herself from the tool, only to re-engage with the tool at some later time, which commonly ranges from seconds, to minutes, to hours, to even, days, later. To practice what is herein referred to as the "tool disengagement/re-engagement process", the worker may employ one of two general known techniques. Each is now discussed, including the problems associated with each technique.

i) "Drop it and Pick it Up" Technique

A first known technique a worker may employ when disengaging and then reengaging a tool is herein referred to as the "Drop It and Pick It Up Technique". To disengage from the tool following use thereof, the worker transfers the tool to a nearby surface, by laying, dropping or throwing the tool onto the nearby surface, with the tool coming to rest upon its side, and in a more or less horizontal position. The nearby surface, in general, may exist over a range of elevations relative to the tool user/worker. Most commonly, however, this surface is at ground level to waist level, and is either a natural surface, such as the surrounding soil/lawn area, a rock outcrop, or a horizontal tree trunk, or is a man-made surface, such as a floor or a paved/concrete area. Furthermore, the nearby surface can further include the level tops of other common nearby features, such as a table top, picnic table, bench or chairs.

There are several problems/issues associated with this known technique of tool disengagement/re-engagement. First, the worker typically does not carefully lay the tool down onto the nearby surface, but rather either drops the tool, usually from waist level, directly down to the area in the immediate vicinity of her/his feet, or actually throws the tool to a location at some distance. Doing either act can result in scratches, dents or other structural damage to the tool, as the tool may also strike other objects. Likewise, the disengaged tool can damage the surface upon which the tool lands, as well as any other unintended targets that the tool may bounce off, or otherwise strike, along the way. In any of the foregoing cases, the resulting damage to the tool can be considerable, and costly, and the remediation of damage caused to other property may cost time and money, as well as possibly leading to expensive legal suits and/or insurance claims.

A second problem with the "Drop It and Pick it Up" technique centers on the re-engagement step. While the act of laying, dropping or even throwing a tool onto a nearby surface usually does not entail overly strenuous physical activity on the part of the worker, the same cannot be said of the subsequent step of re-engagement with the tool. Particularly in those cases in which the surface upon which the tool rests is at ground level or thereabouts, the act of picking up the tool requires the worker to bend substantially at the waist, in combination with various degrees of bending at the knees, in order to get her/his hands down far enough to grab and reacquire the tool. This physical maneuvering can be taxing on the body, contributing to the overall physical exhaustion associated with performing a given work task, especially if the task at hand requires many instances of one having to retrieve a tool placed at ground level. Moreover, persons with back problems, or other muscular problems or disabilities, are even more prone to experience physical strain or injury during re-engagement of the tool. In fact, some persons simply may not be able to physically pick up a tool from a ground surface elevation.

Yet a third problem associated with the "Drop It and Pick It Up" technique is that generally a tool resting in a horizontal position is more difficult to spot during the re-engagement process than if the tool was positioned in a more vertical orientation. For example, a leaf rake resting on top of the surface of a lawn is much more difficult to find, especially from a distance, than if the same rake was positioned in a more upright orientation. Adding to this, and especially true in construction or landscaping situations, the surface upon which the tool is resting may be covered with grass, leaves, branches, soil, gravel, mulch or other types of debris, which might be partially hiding or camouflaging the tool, making it even that much more difficult to spot when seeking to retrieve or re-engage the tool. This situation can be especially problematic during a job site cleanup, when the task at hand is completed, and the worker is rounding up the tools and preparing to depart, in that a horizontally placed tool may get overlooked entirely, and thus be inadvertently left behind at the work site.

Further still, a fourth related problem of the "Drop It and Pick It Up" technique is that an overlooked tool may then become a danger to persons subsequently working in the same area. For example, an unsuspecting person may trip on or fall upon the tool, potentially causing bodily harm. Importantly, certain rakes and shovels left horizontally at ground surface level can be accidentally stepped on at the implement end of the tool, causing the tool handle to arc upward rapidly toward the person, often striking the person in the upper body or the face and head area and causing injury. Relatedly and in outdoor situations the possibility exists that other persons such as other contractors, e.g., lawn mower operators, may not see the tool laying horizontally on the lawn or similar surface and thus run their equipment over the exposed tool, possibly causing damage to the operator or to the equipment. In each of these cases innocent persons may be harmed, and the business owner/worker responsible for leaving the tool behind could be subject to legal action as well as insurance liability claims. And, of course, any tool left behind may also end up getting damaged, or permanently lost.

ii) "Stop and Prop" Technique

A second known tool disengagement/re-engagement technique is herein referred to as the "Stop and Prop" technique.

This technique occurs when a worker disengages from a tool by leaning the tool against another object, such that one or more points along the handle of the tool come into contact with the object, with the tool resting at a noticeably vertical orientation (which is nearly always less than a ninety degree angle). For purposes of the following discussion, the term 'propject' shall refer to "that object against which the tool is to be propped."

Common propjects in outdoor settings may include the walls of buildings, the trunks of trees, the branches of shrubs, the outside surfaces of automobiles or landscaping/construction machinery, as well as a myriad of landscape features, such as large ornamental rocks, stone walls, wooden or steel fences, statuary, garden pots, and so forth. Common propjects in indoor settings may include interior walls, office equipment, as well as a wide variety of furniture.

There are a number of issues/problems associated with the Stop and Prop technique of using a propject as the means for disengaging and re-engaging, particularly with a long-handled tool. A first issue is that a propject may not be present at all at the time of disengagement. Similarly, a suitable object against which the tool can be propped may be located so far from the spot where the worker is seeking to dis-engage the tool that he/she decides the time and effort to walk back and forth to the propject is not worthwhile. Put another way, the worker may reason that propping the tool against an object is not an efficient use of energy and time, and that it may be less tedious and more efficient to simply lay, drop or throw the tool to a nearby horizontal surface (as described already regarding the "Drop It and Pick It Up" technique).

Second, there are issues concerning the physics involved in creating a successful 'tool-propject interaction'. In general layman's terms, a successful propject-tool interaction must meet two (2) physical criteria: a. the propject must have sufficient mass to be able to support the weight of the tool, and b. the surfaces of the two objects, at their areas of contact, must exhibit sufficient friction so that the tool is effectively retained when placed against the propject. The elongated handles of long-handled tools are typically circular to oval in cross section, being ergonomically designed to comfortably fit the human grip. Accordingly, these handles are relatively small in diameter, which means that when such a handle is placed against most propjects the actual surface area of the handle making contact with the propject is very small, especially if the handle only contacts the propject in one spot. Accordingly, this situation, in and of itself, severely limits the amount of friction that can exist between a tool and its propject, meaning that the tool may eventually fall away from the propject over time.

Turning now to a potential propject, and assuming that the propject has sufficient mass to support the weight of a long-handled tool, the propject should minimally have a sufficiently wide surface area in order to accommodate the point of contact of the tool handle. Beyond this and in general, the wider the surface area, and the more concave the surface area is (up to the point where the handle will still fit into the concave area), the better the propject, in terms of the potential for sufficient friction between the propject and the tool handle. To illustrate the latter point: a leaf rake propped up against a small diameter tree, or the steel round pipe of an outdoor basketball stand, experiences considerably less contact friction than does that same rake propped up against the inside corner of intersecting walls, or the narrow slot between two slats of a wooden fence.

Summarily and due to the width or shape of its contact surface, all else being equal, the propject may not offer sufficient friction to hold the tool in its propped position, or at least not enough friction for the intended duration of remaining propped. Quite simply, a propped tool may have fallen down by the time the worker seeks to re-engage the tool.

Third, a tool handle may have dirt, oil, grease, water or other slippery contaminants on the surface of the tool handle, and the propject itself could be dirty, or slippery due to the propject being manufactured from certain materials, such as the vinyl siding on an outside wall or the metal exterior of a piece of machinery or automobile. As a result, the amount of available friction between the contact areas of the tool handle and propject can be further degraded. One also observes further potential for a failed propject-tool interaction in those frequent outdoor situations involving rainy, snowy or windy conditions, all of which affect the ability of a propject to reliably hold a tool in an adequately propped position.

Accordingly, there is a pervasive need in the field to provide a more efficient and effective means for propping a tool or related implement (e.g., fishing pole, etc.) which is characterized by an elongate handle that would require disengagement and later re-engagement by a person.

There is a further prevailing need to provide an improved gripping handle for an implement, such as but not limited to a garden tool, in terms of providing comfort and securement in terms of handling and gripping of the tool when the tool or other implement is in use.

BRIEF DESCRIPTION

Therefore and according to one aspect, there is provided a handle configured to permit retention of a tool in a vertical or substantially vertical orientation within a ground surface when the implement is not in use, the handle comprising an elongate handle body having a gripping end and an opposing implement end that attaches to an implement. A spike is embedded in the gripping end of the elongate handle body, the spike having an exposed axial portion and in which a compression spring is disposed about the exposed axial portion of the spike. A hollow sleeve is sized and adapted to be fitted over the compression spring and the gripping end of the elongated handle body, the hollow sleeve having an opening in an upper end sized to permit passage of the exposed portion of the spike, the hollow sleeve further including one or more longitudinal slots. A pin member is transversely disposed within the gripping end of the elongate handle body, the pin member having at least one end extending into the one or more longitudinal slots of the hollow sleeve such that the elongate handle body is movable axially between a first position and a second position to enable the exposed axial portion of the spike to be advanced through the opening of the hollow sleeve for advancement into the ground surface.

According to one version, the handle is made from wood and a metal ferrule is disposed over the gripping end of the handle into which the spike is imbedded. According to at least one version, the handle can include a bumper or guard provided in an upper portion of the hollow sleeve. The bumper and the protective sleeve include aligned openings to enable the exposed axial portion of the spike only to pass through for engaging a substrate for propping as the hollow sleeve translates and the spring is compressed. The bumper is preferably made from a rubber or other sound absorbing material that can be a part of a cap of the hollow sleeve or alternatively, the bumper can be integrated (molded, etc.) into the hollow sleeve directly.

The hollow sleeve provides shielding/protection to the user from the protruding spike and further serves as a gripping handle when the tool is in use. According to at least one version, the hollow sleeve may include a plurality of gripping portions or ribs that are formed on the outer surface of the sleeve and disposed in spaced relation. The gripping portions assist in the gripability of the handle for purposes of use and additionally prevent moisture and dirt from entering the interior of the hollow sleeve via the one or more longitudinal slots.

According to another aspect, there is provided a method of manufacturing a handle for an implement enabling the implement to be propped in a substantially vertical orientation when the implement is not in use. The method comprises providing an elongate handle, the handle having a gripping end and an opposed implement end and imbedding a spike within the gripping end of the elongated handle such that there is a predetermined axial exposed section of the spike extending therefrom. A compression spring is disposed about the exposed section of the spike, and a hollow protective sleeve is provided over the compression spring and the gripping end of the elongate handle including the exposed section of the spike. The hollow sleeve has an opening in an upper end sized to permit passage of the exposed portion of the spike, the hollow sleeve further including one or more longitudinal slots. According to the method, a pin member is transversely disposed within the gripping end of the elongate handle body, the pin member having at least one end extending into the one or more longitudinal slots of the hollow sleeve such that the handle body is movable axially between a first position and a second position to enable the exposed axial portion of the spike to be advanced through the opening of the hollow sleeve for advancement into the ground surface.

The present invention described herein is a handle, designed for any of various implements such as but not limited to garden tools, which traditionally have used long, elongate rod-shaped handles. The herein described handle allows the user of such implements to disengage from using the implement by inserting a gripping end of the handle into a nearby suitable substrate, such as a ground surface, in an upright, or substantially upright or vertical configuration, so that the thereby propped handle can be left standing, until such time that the user seeks to re-engage with the tool or other implement for later use.

According to at least one embodiment of the present invention, the head or non-working end of a traditional rod handle tool, that is, the approximately 7 inches of the handle opposite the implement end, can be removed, and replaced, in part, with a much smaller-in-diameter steel rod. One portion of the rod is embedded down the center of the now-shortened traditional rod handle, running perpendicular to the cross section, with the remainder of the rod protruding from the handle for the needed distance to recreate the original overall length of the traditional rod handle. The protruding tip of the steel rod has a flat cross-section, that is, the protruding tip is not sharpened, but due to its actual function, we hereinafter refer to the protruding portion of the rod as a “spike”, since the rod is configured itself to be pushed, or “spiked”, into the substrate when the implement is propped.

Since the presence of a small diameter spike at the head of the handle would be somewhat dysfunctional and quite uncomfortable to use, as well as being potentially dangerous to the user, the present invention features a spring-loaded hollow protective sleeve. The protective sleeve is basically the general size and shape of a traditional handle grip, which completely encloses the spike when the tool or other implement is in use or when the tool is idle, but not yet propped. Yet, when the user seeks to prop the implement, the hollow protective sleeve smoothly translates axially along the outer surface of the rod handle, as the user applies downward pressure on the handle. This downward force exposes the spike and allows the spike to penetrate the substrate. And, then, when the user wishes to re-engage with the implement and thus pulls the implement upward from the substrate, the compressed spring within the hollow protective sleeve is incrementally released, and automatically encloses the spike as the spike is being extracted from the substrate. In essence, the user could prop and un-prop the implement without ever having seen the spike at all. In addition to its protective function, the hollow sleeve serves to recreate much of the original functionality of the handle head of a traditional long-handled tool or other implement.

Advantageously, the present invention can be applied to a wide range of implements, including but not limited to a myriad of yard and garden tools (such as, for example, rakes, hoes, weeders, shovels and brooms), various portable flags and surveyor tools, and even fishing poles, among others.

Given the many drawbacks described in the previous paragraphs with the two main tool disengagement/re-engagement strategies, the current invention seeks to provide a solution by creating an alternative third technique, labeled here as the “prop on the spot” technique. This novel technique involves the head (the gripping end) of the implement handle itself being a propping mechanism, which allows the worker to securely prop the tool right on the spot where he/she wishes to disengage from the tool or other implement, and to later on, retrieve and re-engage with the tool. The herein described invention maintains the implement in an upright or substantially upright (vertical) position, making the propped implement easier to spot, and thus less likely to be left behind, such as from a work site where the implement can pose dangers to persons subsequently in that area or to their equipment. Moreover, the worker no longer has to waste time and energy looking for or walking back and forth to a suitable propject, nor stoop over repeatedly over the course of the work project to retrieve his/her tool, all of which makes the work process more efficient and less stressful upon the back and other body parts. Persons with back problems, or other disabilities, in particular will benefit greatly by using the herein described invention. In addition, the worker no longer has to worry about damaging the implement, or surrounding objects, such as by using either of the other two prior described techniques for disengaging and re-engaging an implement.

These and other features and advantages will be readily apparent from the Detailed Description, which should be read in conjunction with the accompanying drawings.

BRIEF DESCRIPTION OF THE DRAWINGS

FIG. 1(*b*) is a side elevational and sectioned view of the partially assembled handle of FIG. 1(*a*) rotated by 90 degrees about a major axis of the handle;

FIG. 2(*b*) is the side elevational and sectioned view of the handle of FIG. 1(*b*) in a fully assembled condition and prior to deployment;

FIG. 3(*b*) is the side elevational view of the handle of FIGS. 1(*b*) and 2(*b*);

FIG. 4(*a*) is a top perspective view of the handle of FIGS. 1(*a*)-3(*b*), shown in section;

FIG. 4(*b*) is an enlarged view taken about section A-A of FIG. 4(*a*);

FIG. 4(*c*) is an enlarged view, in section, taken about Section B-B of FIG. 4(*a*);

FIG. 5(*b*) is a side elevational view, taken in section, of the handle of FIG. 5(*a*) in a deployed condition and rotated 90 degrees about the main axis of the handle;

FIG. 6(*b*) is the side elevational view of the handle of FIG. 5(*b*) in a deployed condition;

FIG. 7(*b*) is an isometric view of the handles of FIG. 7(*a*), each rotated 90 degrees about their main axis;

FIG. 11(*b*) is a side by side partial assembly view of the compression spring, shown in a compressed condition, relative to the bumper portion of the protective sleeve;

DETAILED DESCRIPTION

The following describes various embodiments of a handle for an implement, such as a garden tool, and a related method of manufacture as configured in accordance with aspects of the present invention. It will be readily apparent that the embodiments are merely exemplary and that variations and modifications are possible within the intended scope of the invention. Various terms which include “inner”, “outer”, “above”, “below”, “distal”, “proximal”, “top”, “bottom” and the like are used throughout this description in order to provide an adequate frame of reference with regard to the accompanying drawings. These terms, however, are not intended to be limiting of the scope of the invention unless so specifically indicated. In addition, the drawings are provided to depict salient features of the invention. The drawings should not be used for scalar purposes.

For purposes of this discussion, the term “implement” refers to the component attached to the working end of the tool. The term further refers to the entire apparatus in use; for example a garden tool such as a hoe, weeder or rake, among others, is an implement for purposes of this discussion. As such, a “tool” is an example of an implement that is attached to the working end of the rod handle and a tool or implement is also the entire apparatus. Accordingly, the terms “tool” and “implement” are herein used interchangeably throughout the discussion.

Figure 1:
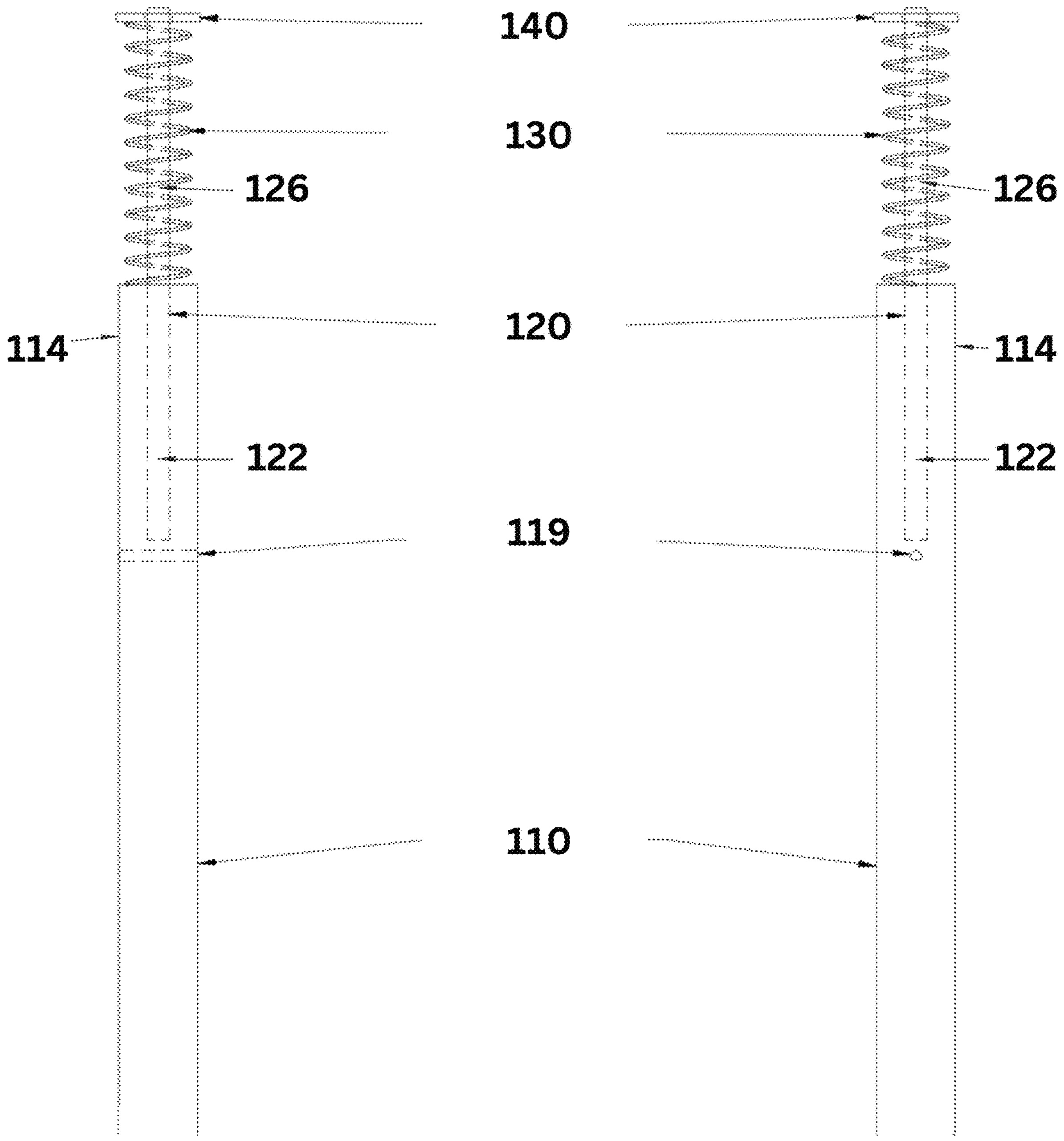
FIG. 1(*a*) is a side elevational and sectioned view of a partially assembled handle made in accordance with an exemplary embodiment of the present invention.
Figure 2:
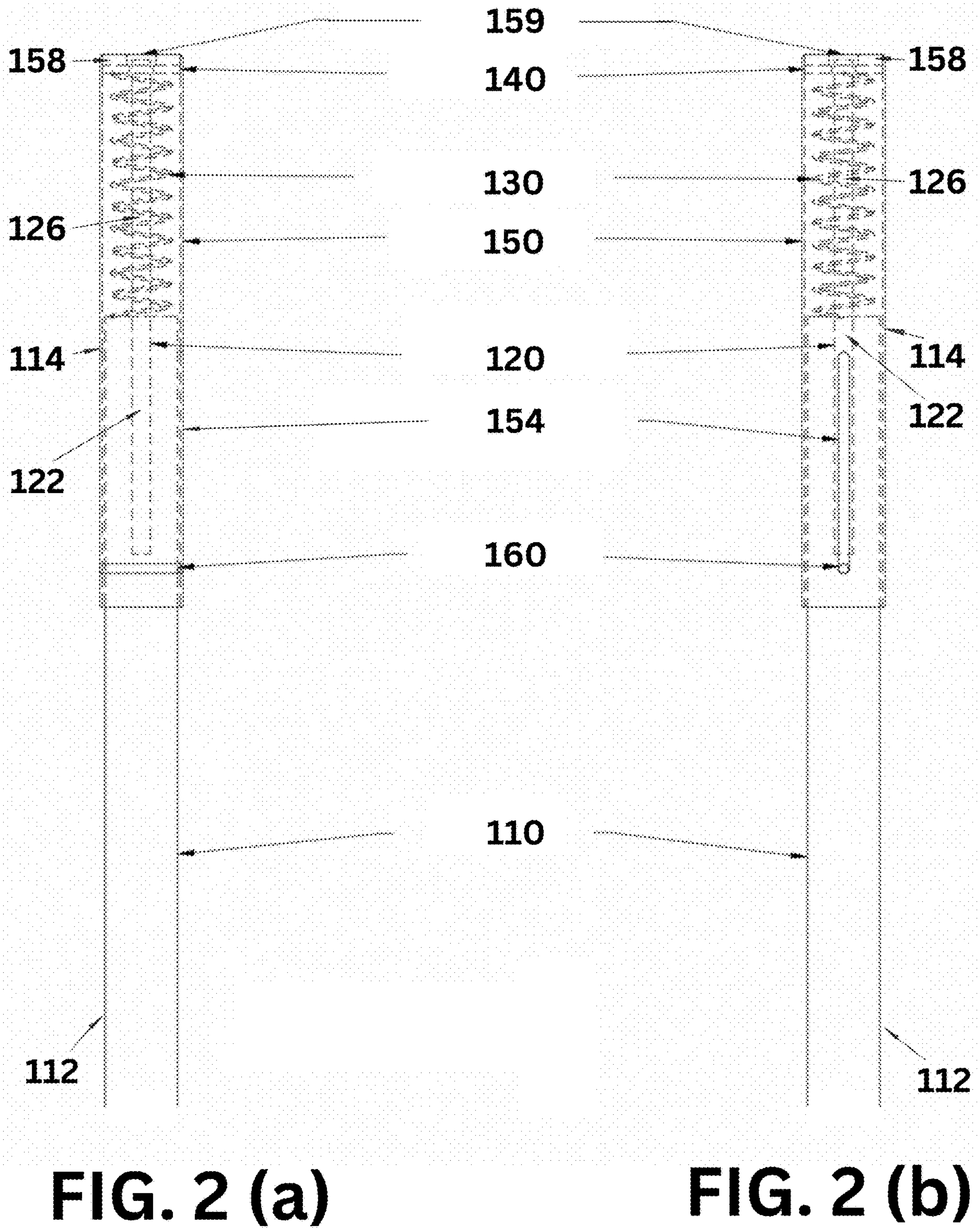
FIG. 2(*a*) is the side elevational and sectioned view of the handle of FIG. 1(*a*) in a fully assembled condition and prior to deployment.
Figure 3:
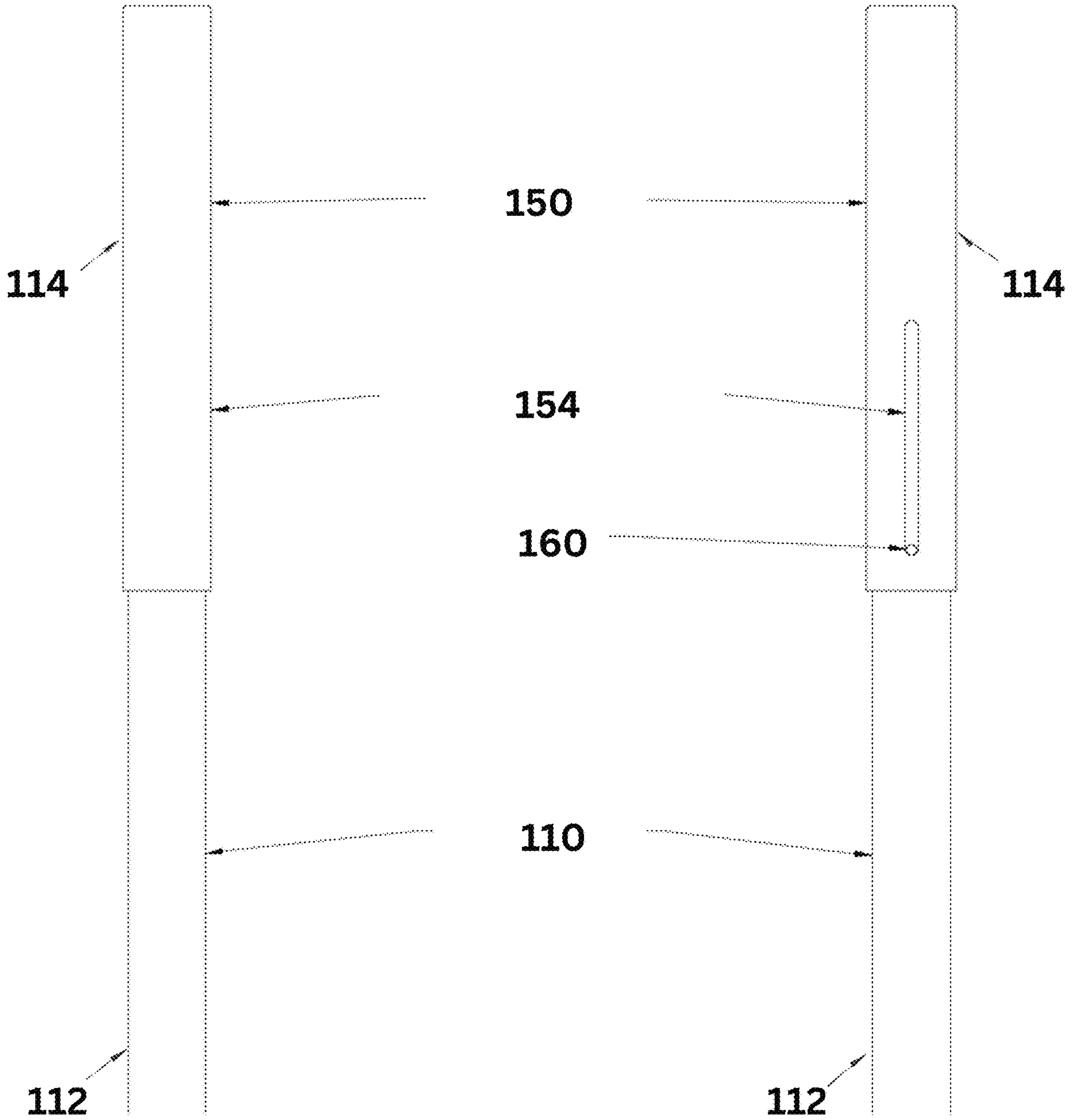
FIG. 3(*a*) is a side elevational view of the handle of FIGS. 1(*a*) and 2(*a*)

FIGS. 1(*a*)-6(*b*) depict a handle for a garden tool that is made in accordance with a first exemplary embodiment of the invention, and which is assembled from five (5) major components. These components include a rod handle 110, spike 120, compression spring 130, bumper or guard 140, and a protective sleeve 150, the latter having a securing pin member 160. Each of these components will now be described in greater detail.

The rod handle 110 is intended to mimic the general size and shape of elongate handles used for any of the myriad of long-handled tools, such as garden tools, or other related implements available in the marketplace. The “working” or “implement” end 112 (shown as truncated throughout each of the depictions) of the rod handle 110, to which an implement (not shown) is typically secured, is not of further concern, only to state that the implement end could encompass a number of varied shapes, depending upon how the handle 110 attaches to the implement.

The length and diameter of the rod handle 110 will vary depending upon the needed structural requirements to handle the stress loads associated with different implements, but mainly it is the diameter of the handle 110 that is of concern with the understanding that the overall length of the rod handle 110 varies depending upon the tool. As a result, all of the associated figures of the handle 110 referred to throughout this description depict the rod handle 110 as being “truncated” at the implement end 114. The diameter of the rod handle 110 dictates the inner diameter for the protective sleeve 150, in that the former diameter must be slightly smaller than the latter in order for the protective sleeve 150 to easily telescope over the handle 110 during a propping operation.

In accordance with this embodiment, the other or gripping end 114 of the rod handle 110 receives the spike 120, the latter being preferably made from steel, which is embedded into the center of the cross section of the rod handle 110. The imbedded spike 120 extends in a direction which is parallel to or coterminous with the longitudinal axis of the rod handle 110 wherein a axial portion 126 of the spike 120 outwardly protrudes over a length of several inches.

The rod handle 110 can be manufactured from a variety of materials, including wood, bamboo, fiberglass, composites, steel, aluminum, and various plastics, using any of the associated common manufacturing processes, and may be either solid or hollow in cross section. In addition, the spike 120 can be embedded into the gripping end 114 of the rod handle 110 by any number of suitable manufacturing processes, including but not limited to any of a friction/interference fit, the use of adhesives, ferrules, screws, bolts, pins, and overmolding.

The spike 120 according to this exemplary embodiment is made from a small diameter steel rod, typically a hardened steel. In other versions, the spike can be fabricated by known means from fiberglass or other man-made materials. A portion 122 of the spike 120 is embedded into the gripping end 114 of the rod handle 110, with the opposing end 124 of the spike 120 including the exposed axial portion 126, which as previously noted protrudes several inches in a direction parallel to the longitudinal axis of the rod handle 110. Most of the length of the protruding axial portion 126 becomes the actual "spike", which is used to penetrate the substrate during a dis-engaging/propping operation, as described in greater detail below.

The dimensions of the spike 120 vary, depending mostly upon the weight of the implement end 114 of the tool, since that weight is suspended high in the air by the spike when the spike is embedded in the substrate when the handle 110 is propped. That is, the more the implement weighs, the bigger in diameter, and the longer the spike should be, in order to securely support the overall load taken up by the tool against gravity. For example, a spike having a diameter of ¼ inch is sufficient for most tools, wherein the length of the protruding portion of the spike 120 in most cases falls within the 4-9 inch range, depending upon how far the rod is embedded into the rod handle 110, and the desired length of the spike that ends up penetrating the substrate.

The compression spring 130 extends lengthwise in its fully expanded configuration around the exposed axial portion 126 of the spike 120 extending from the rod handle 110, with one end of the compression spring 132 being positioned on the level cross section end of the rod handle 110, and the opposite end of the compression spring 130 in contact with the bumper 140. The diameter of the compression spring 130 is slightly smaller than the diameter of the rod handle 110, so that the compression spring 130 will expand and contact axially within the confines of the protective sleeve 150, the latter being slightly larger in diameter than the rod handle 110, while the length of the compression spring 130 is dependent upon the length of the exposed axial section 126 of the spike 120 extending from the gripping end 114 of the rod handle 110, being, in general, slightly longer than the extended spike 120. In FIGS. 1(*a*), 1(*b*), 2(*a*), and 2(*b*). the compression spring 130 is shown in its slightly compressed state during the undeployed phase of the invention.

The compression spring 130 operates in unison with the protective sleeve 150, in order to provide both retractability and user protection functions. To explain the user protection function in accordance with this exemplary embodiment and when the tool is either in use, or is idle but not propped, the compression spring 130 is nearly completely released, and only slightly presses against the bumper 140, which in turn presses against an internal top edge of a cap portion 158 of the protective sleeve 150, with the combined result being that the protective sleeve 150 is pushed to its furthest extent along the spike 120, and, as such, extends just slightly further than the end 126 of the spike 120 (see FIG. 4(*b*)). The spike 120 is thus positioned in a slightly recessed manner inside an opening 159 formed in the cap portion 158 at the top of the protective sleeve 150, so that the tool user does not ordinarily touch the spike 120 while using the tool (although if the tool user does accidentally push down on the protective sleeve 150 while working, the distal tip of the spike 120 can be exposed to a limited extent, but usually without any appreciable effect upon the comfort or safety of using the tool).

Figure 5:
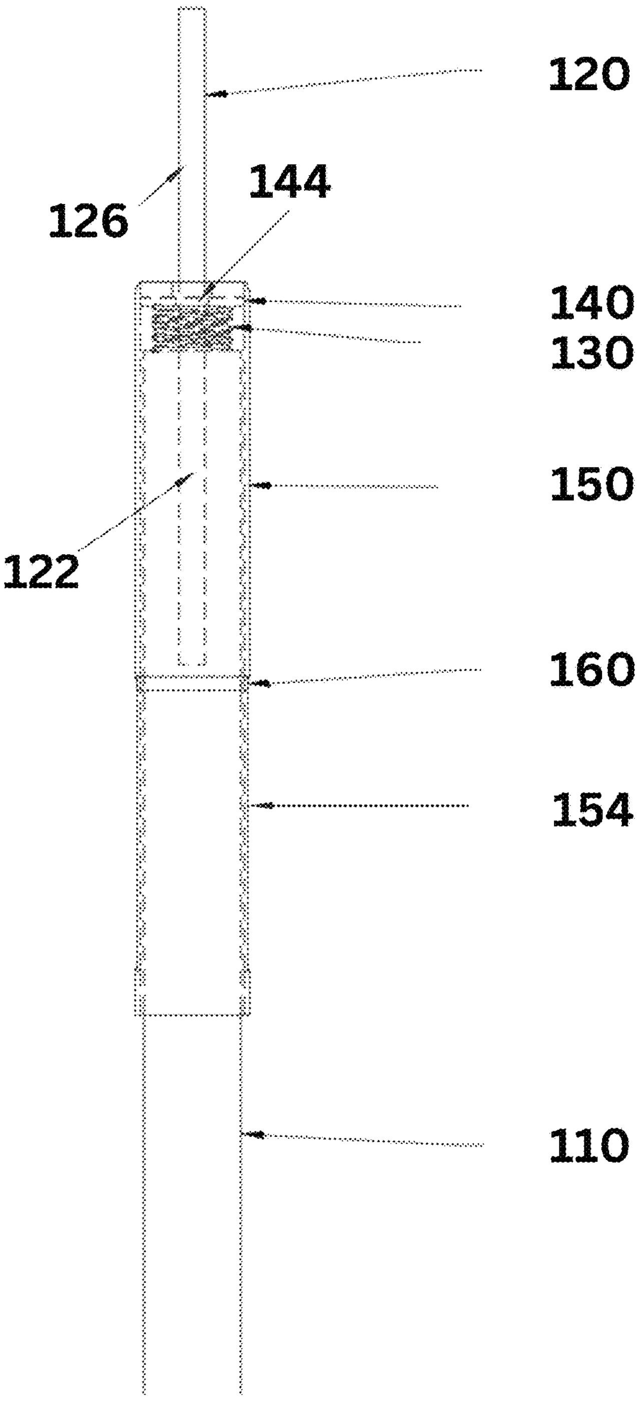
FIG. 5(*a*) is a side elevational view, taken in section, of the handle of FIGS. 1(*a*)-4(*c*) in a deployed condition.
Figure 5:
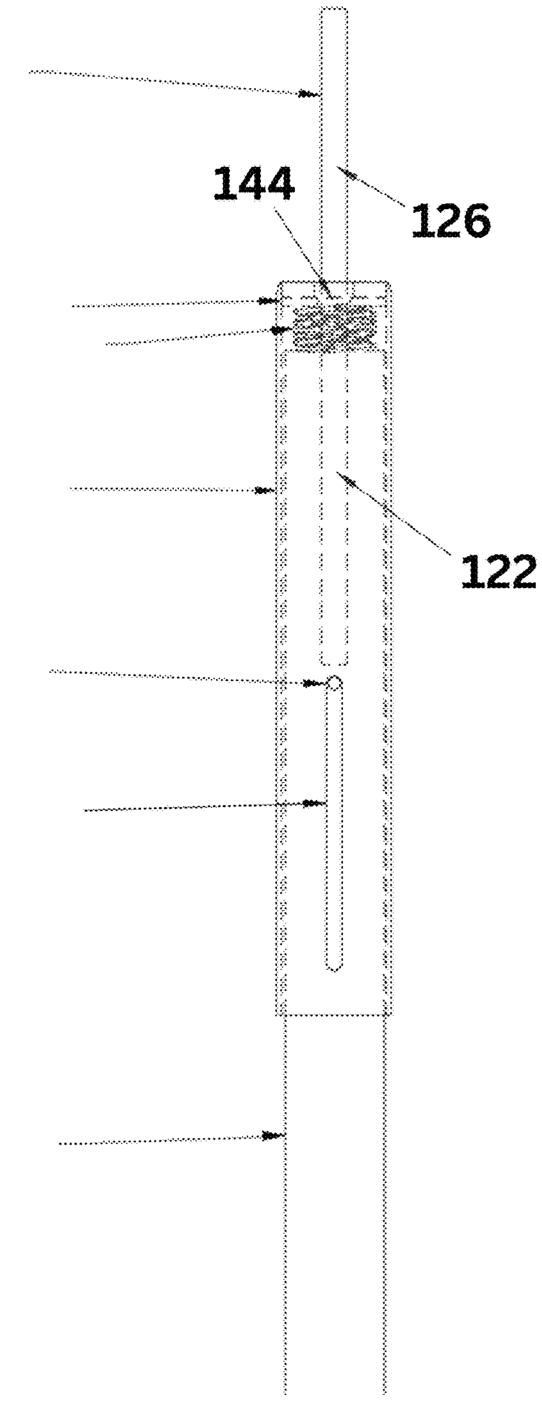
Figure 6:
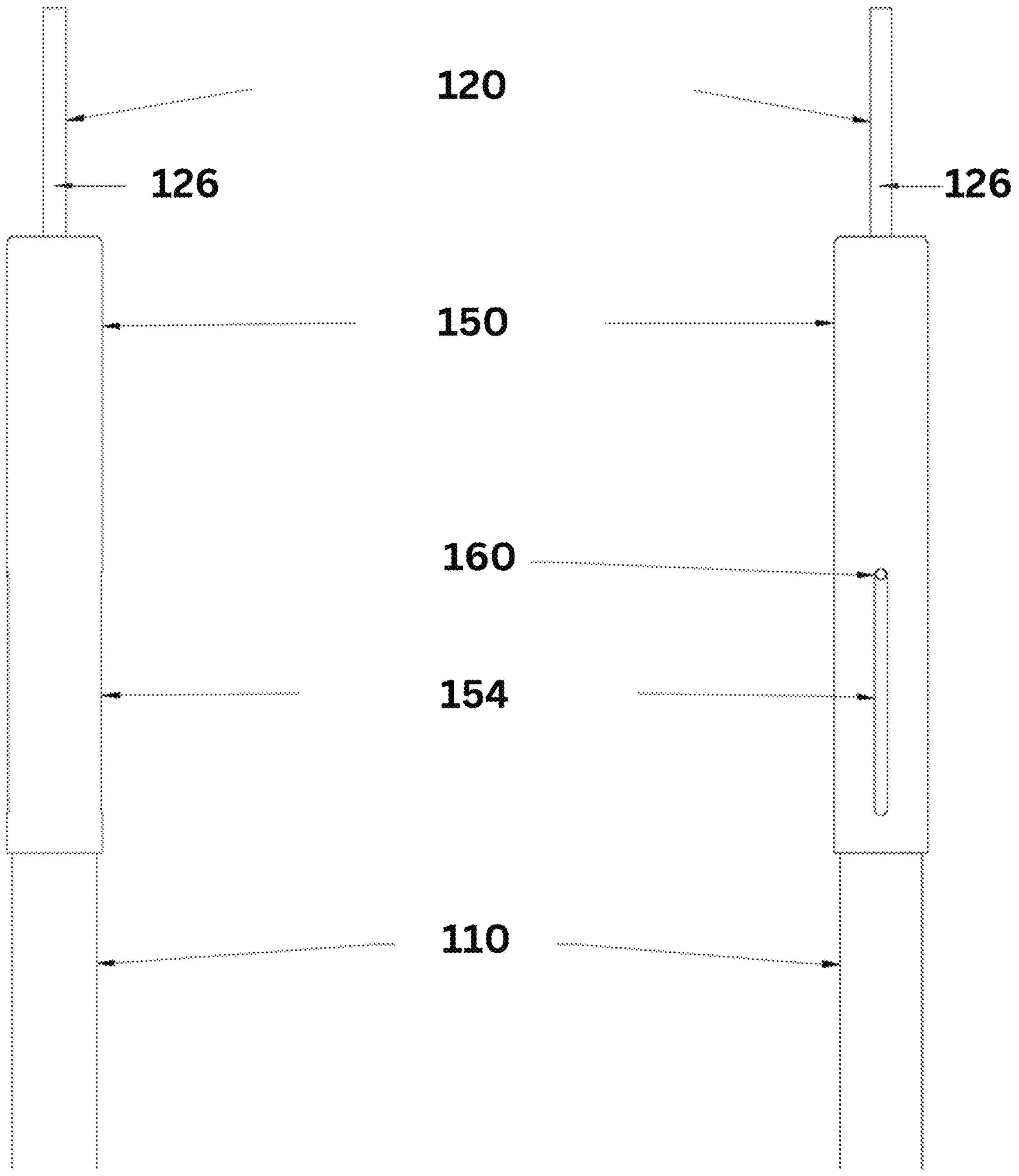
FIG. 6(*a*) is the side elevational view of the handle of FIG. 5(*a*) in a deployed condition.

Turning to the retractability function of the compression spring 130 and when the tool user wishes to prop the tool in question, the user presses the upper end of the protective sleeve 150 in a downward motion against the substrate, this downward force causing the compression spring 130 to compress as the protective sleeve 150 telescopes along the outer surface of the rod handle 110, thus simultaneously exposing and allowing the spike 120 to penetrate the substrate. This action continues until the compression spring 130 reaches its full compressed height as shown in FIGS. 5(*a*) and 5(*b*), at which point the protective sleeve 150 can travel no further along the rod handle 110, and the spike 120 is at its longest potential length (see FIGS. 5(*a*) and 5(*b*)). Assuming the substrate is suitable, the tool is now in its propped position.

When the tool user wishes to re-engage with the tool, the user simply grasps and pulls upwardly on the rod handle 110, causing the reverse chronology of the just described series of propping steps. More specifically and as the exposed axial portion 126 of the spike 120 is pulled out from the substrate by the user, the compressed spring 130 releases and pushes the hollow protective sleeve 150 axially along the rod handle 110, and along the spike 120, until such point that the spike 120 is completely free from the substrate, and the protective sleeve 150 is once again fully encapsulating the spike 120, wherein the sleeve 150 is effectively held in that position by the minor compression still present in the spring 130.

The bumper/guard 140 is positioned according to this exemplary embodiment between one end of the compression spring 130 and more specifically the end of the spring 130 furthest away from the rod handle 110 and the inside edge of the cap portion 158 of the protective sleeve 150, with the spike 120 running through the interior of the bumper 140. The bumper 140 is positioned and sized so as always to experience some level of force from the compression spring 130, which therefore maintains the bumper 140 snugly in place in accordance with this exemplary embodiment. A primary function of the bumper 140 is to reduce the noise that would otherwise be created by the exposed axial section 126 of the spike 120 as it contacts against the interior wall of the through opening 159 formed in the cap portion 158 of the protective sleeve 150 while the tool is being used.

According to this exemplary embodiment, the bumper 140 is a fairly thick washer, preferably made from a natural or synthetic rubber, or alternatively from a similarly functioning, sound-damping material. According to this exemplary embodiment, the outer diameter of the bumper 140 matches the interior diameter of the cap portion 158 of the protective sleeve 150, which gives the comparatively smaller diameter end of the compression spring 130 a full, flat surface for engagement. The diameter of an inner through opening 144 of the bumper 140 is slightly larger than the diameter of the axial exposed portion 126 of the spike 120, so that the spike 120 can easily pass through the bumper 140, but not so large that the bumper 140 allows much lateral movement of the top cap section 158 of the hollow protective sleeve 150 during use of the tool. In all, these dimensions of the bumper 140 allow the bumper 140 to act as a supplement to the cap section 158 of the protective sleeve 150 having the through opening 159, by reducing or isolating the noise that otherwise would be produced, and by adding structural stability to the top cap section 158 of the protective sleeve 150.

The protective sleeve 140 is a columnar-shaped shell of hollow construction, with its end that faces toward the implement end 114 of the tool being open, while the opposing or top end of the sleeve having the cap section 158 with the through opening to permit the passage of the exposed axial section 126 of the spike 120. According to various alternative embodiments, shown in FIGS. 7(*a*) and 7(*b*), a cap portion 158A, 158B is attached over the exterior of the column of the shell of the protective sleeve 150 at the top thereof. Alternatively, the top end of the protective sleeve 150 and the cap portion can be manufactured as a single integral component.

Figure 7:
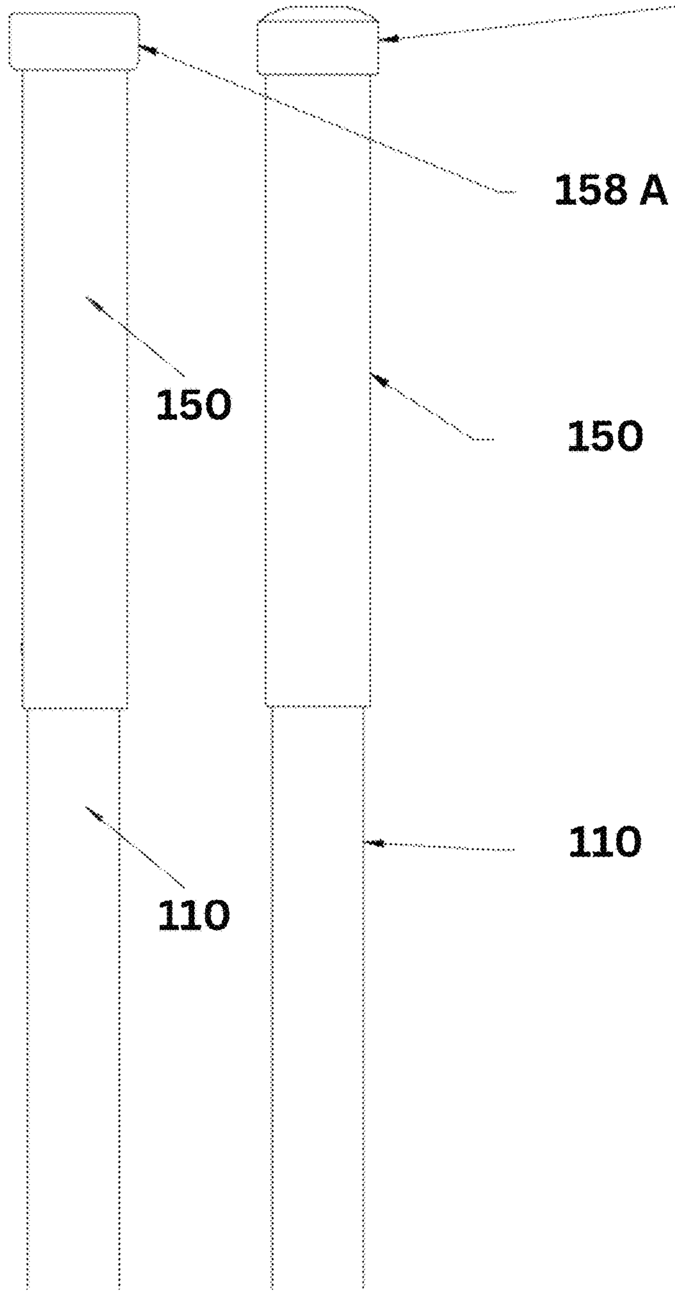
FIG. 7(*a*) is a side elevational view of handles having protective sleeves made in accordance with various aspects of the present invention.
Figure 7:
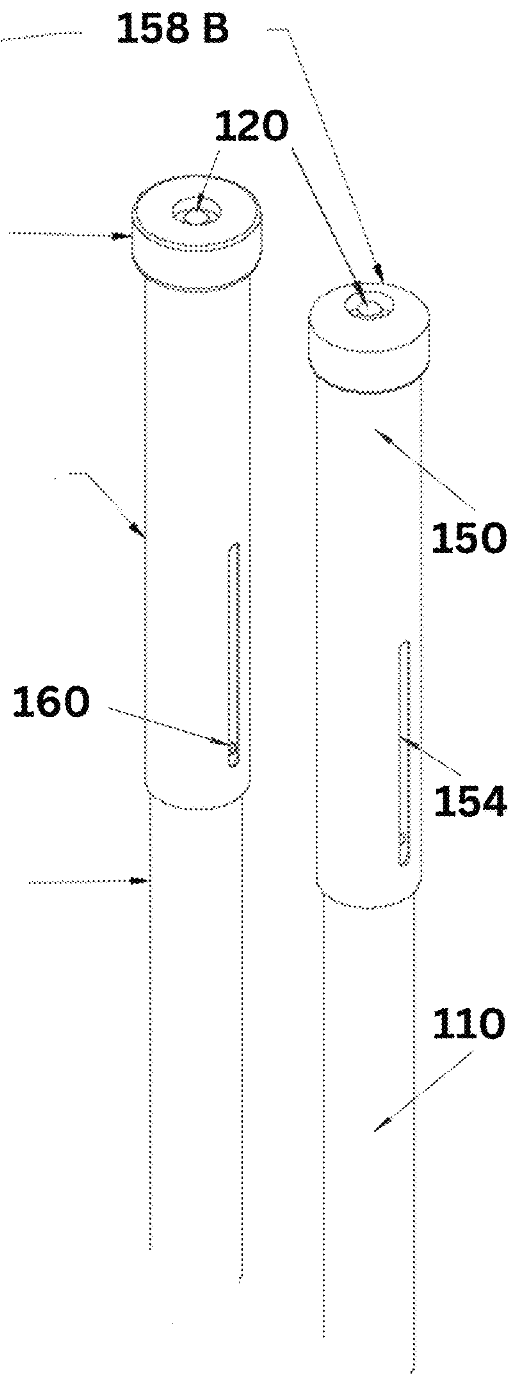

In either case, the cap portion 158, 158A, 158B can assume any of a number of various shapes, ranging from completely flat on top (with rounded shoulders) to having varying degrees of a dome-like shape as shown, for example in FIGS. 7(*a*) and 7(*b*). In any instance, the cap portion 158, 158A, 158B is characterized with the through opening 159 formed in the center of the top surface of the cap portion 158. This opening 159 is slightly larger in diameter than the diameter of the through opening 144 of the bumper 140, with the bumper 140 abutting the bottom side of the cap portion 158. Accordingly and in this described configuration the exposed axial portion 126 of the spike 120, which travels through both the through opening 144 of the bumper 140 and the aligned opening 159 in the cap portion 158, does not contact the inner wall of the opening 159 in the cap portion 158, as the bumper 140 prevents the spike 120 from doing so, and thus the spike 120 is prevented from contacting against the hard surface of the wall of the opening 159 and making excessive noise, as seen in FIG. 4(*c*).

The inner diameter of the hollow protective sleeve 150 is slightly larger than the outer diameter of the rod handle 110. This dimensioning allows the protective sleeve 150 to act as a telescoping component such that during a propping sequence, as the tool user places the end of the protective sleeve 150 against the substrate, and applies downward pressure, the pressure is transferred to the compression spring 130 and the spike 120, and as the spring 130 compresses and the spike 120 is driven into the substrate, the protective sleeve 150 is caused to translate axially along the outside surface of the rod handle 110, until such point that the compression spring 130 reaches its limit of full compression, and the tool is propped (see FIGS. 5(*a*) and 5(*b*)). Similarly, this telescoping action of the protective sleeve 150 is reversed when the tool is un-propped by lifting or pulling the tool or implement from the substrate, an action that causes the biasing force of the compression spring 130 to quickly translate the protective sleeve 150 back to its starting or initial position.

In addition to its function as a shield against what would otherwise be a potentially dangerous, exposed steel spike at the end of a tool handle, the protective sleeve 150 also serves the important role as being the gripping section of a handle. To explain, when the tool in question is in use, or is idle but not propped, approximately the lower half of the length of the protective sleeve 150 is positioned around the exterior of the rod handle 110, while the other half of the protective sleeve 150 serves its protective function of completely encapsulating the spike 120, as well as the compression spring 130 and the bumper 140, and thus forming a grip-like head in this area. Meanwhile, the close telescoping of the rod handle 110 by the lower half of the protective sleeve 150 gives the sleeve 150 further functionality as a substitute for the terminal section of a handle on a traditional long-handled tool, since lateral forces applied to the top half of the protective sleeve 150 by the tool user are quickly countered as the lower half of the sleeve 150 abuts against the adjacent rod handle 110. Some minor wobbling action may occur because of this less than tight overlap of the two components 110, 150, and to allow the spike 120 sufficient freedom relative to the sides of the inner through opening of the bumper 140, by design, which gives the opportunity for lateral movement of the protective sleeve 150 in that location as well.

The protective sleeve 150 is subject at all times, but to varying degrees, to the force generated by the compression spring 130 located within the interior of the sleeve 150. The sleeve 150 is maintained by and prevented from being ejected by the compression spring 130 from the rod handle 110, according to this exemplary embodiment, by a pair of narrow, longitudinally running slots 154, several inches in length, and diametrically opposed to one another. A hole 119 is drilled completely through the rod handle 110, the hole being perpendicular or transverse to the major longitudinal axis of the handle 110, such that each end of the hole 119 aligns with one of the ends of the two slots 154 when the protective sleeve 150 is positioned so that the extending tip of the spike 120 is located inside the opening 159 in the cap portion 158 of the protective sleeve 150 and slightly below the top surface thereof (so that the spike 120 is not an obstacle or a danger to the tool user). The securing pin member 160 is then driven through the hole 119 in the rod handle 110, the length of which allows the pin member 160 to extend on both ends of the hole 119 by a distance at least equal to the thickness of the wall of the protective sleeve 150. As such, the pin member 160 serves its function of containing the sleeve 150 in its desired place, while not appreciably interfering with the tool user's physical interaction with the protective sleeve 150 while using the tool. The length of the two longitudinal slots 154 corresponds with the distance that the protective sleeve 150 axially travels along the exterior of the rod handle 110 during either a propping and unpropping operation, in that the two ends of the pin member 160, which extend beyond the surface of the rod handle 110, as described above, must have an unobstructed pathway in order for the protective sleeve 150 to be able to telescope relative to the rod handle 110 by the proper distance.

The protective sleeve 150 can be manufactured from any available commodity metals or alloys, or any of the various thermoplastics that are common in the manufacturing trade, as well as fiberglass and other composite materials, using any of the manufacturing technologies commonly available. According to at least one embodiment, the protective sleeve 150 including the cap portion 158 can be fabricated from a thermoplastic, using injection molding or 3D printing.

Figure 8:
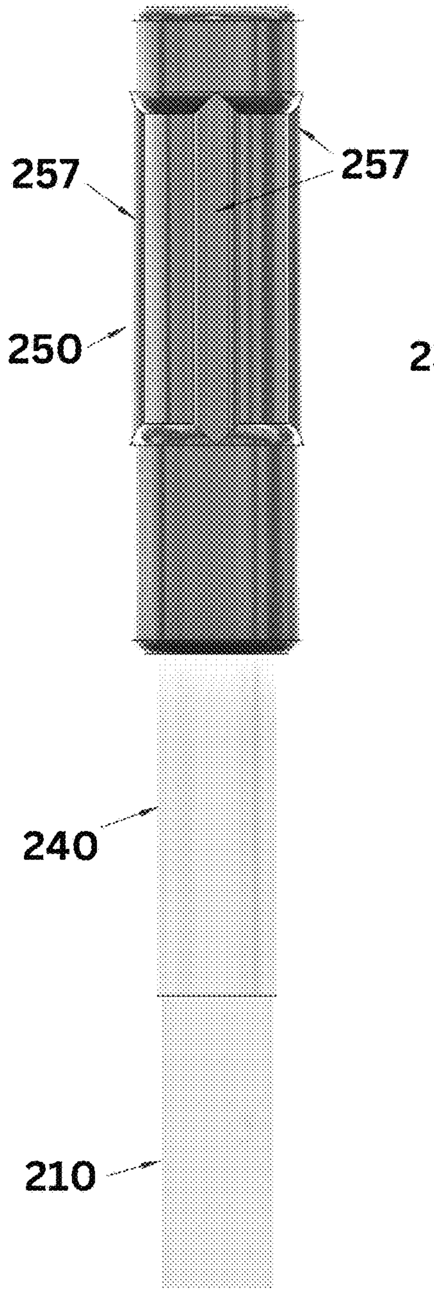
FIG. 8 is a side elevational view of a handle made in accordance with another exemplary embodiment of the present invention.
Figure 9:
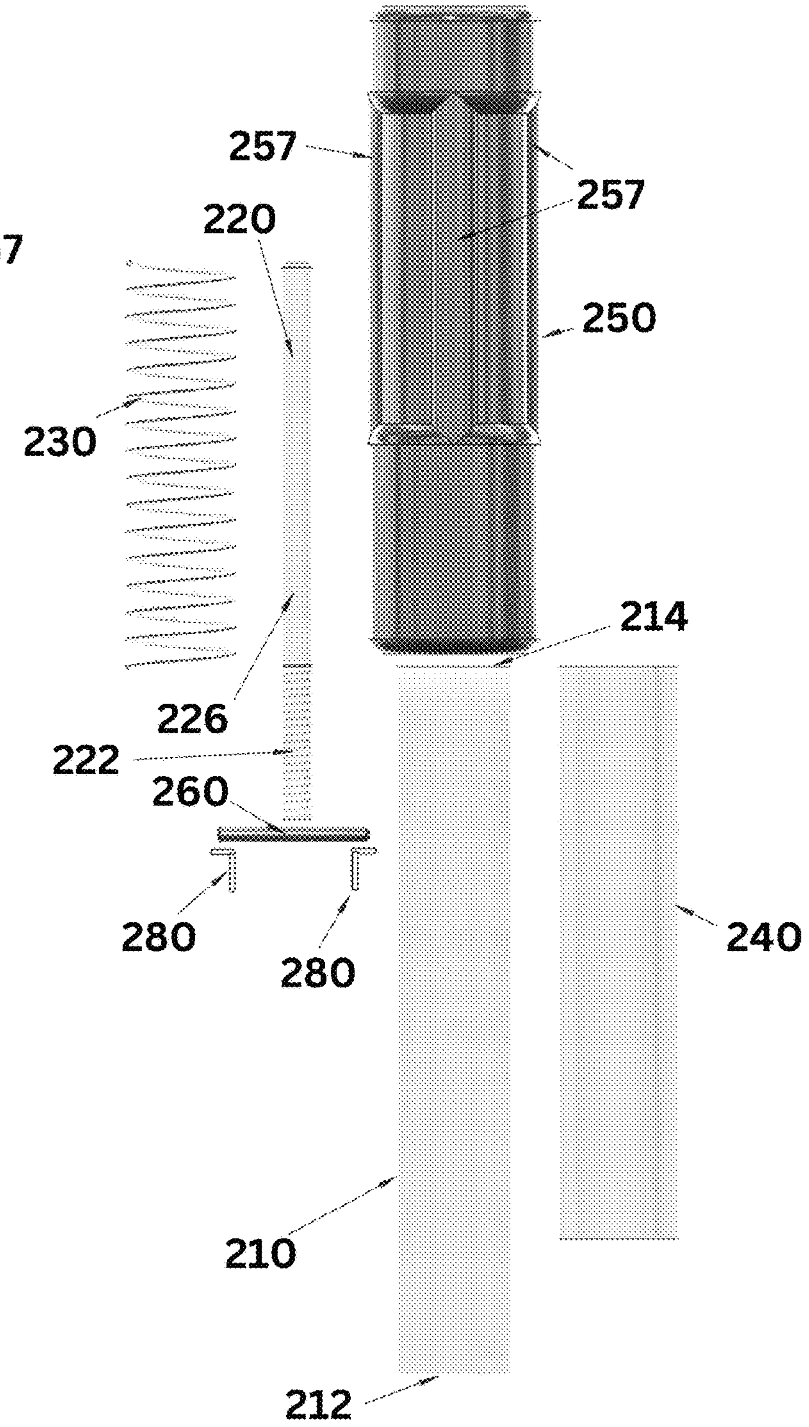
FIG. 9 is an exploded assembly view of the handle of FIG. 8.
Figure 10:
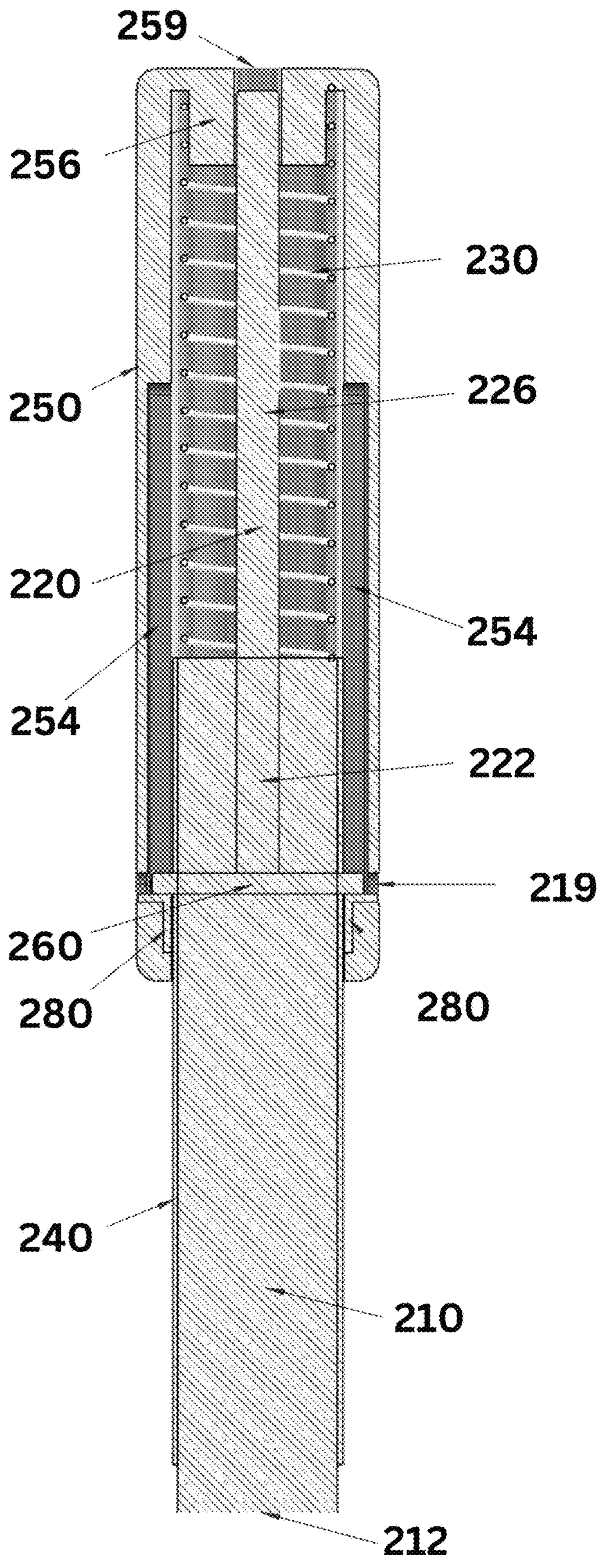
FIG. 10 is a side elevational view, in section, of the handle of FIGS. 8 and 9, in an undeployed condition.

Another exemplary embodiment of a tool handle is shown in FIGS. 8-13. An exploded view of the primary or major components is shown in FIG. 9 that include the following, namely a rod handle 210, a spike 220, a compression spring 230, and a protective sleeve 250, the latter being restricted in terms of movement by a securing pin member 260.

The rod handle 210 according to this specific embodiment is made from wood, although other materials as previously described for rod handle 110, FIG. 1(*a*), could also be utilized. The rod handle 210 is an elongate member defined by an implement end 212 opposite to a gripping end 214. The implement end 212 receives an implement (not shown) of the tool, which is attached or otherwise secured by known means and which does not form any portion of this invention. Typically, an axial section of the gripping end of a conventional handle would initially be removed such that the overall length of the tool would be unchanged. Alternatively, the tool can be manufactured with a smaller tool handle (by several inches) in order to accommodate the exposed axial portion 226 of the spike 220, as well as the protective sleeve 250 that maintains the exposed axial portion 226 in an undeployed condition, such as shown in FIG. 8.

As noted, the rod handle 210 according to this exemplary embodiment is made from wood. In order to prevent issues with swelling/expansion in this version, a metal ferrule 240 is further provided which is added to the gripping end 214 of the rod handle 210. The ferrule 240 prevents the wood beneath the area of the handle 210 in which the protective sleeve 250 translates from swelling due to water/moisture absorption, since localized swelling of the wood handle 210 could impact the ability of the protective sleeve 250 to slide over and telescope relative to the gripping end 214, assuming that the diameters of the protective sleeve 250 and the rod handle 210 are tightly tolerance under dry conditions. The ferrule 240 according to this specific embodiment is made from aluminum, but other materials may be alternatively utilized. The ferrule 240, which is cylindrical in configuration and open at each end, is disposed over the exterior surface of the rod handle 210 at the gripping end 214. The ferrule 240 is retained by a friction fit with the rod handle 210, as well as the securing pin 260 as discussed in a later section.

The spike 220 is a rod-like section, preferably made from a hardened steel and having a threaded end 220 according to this embodiment that is engaged with and imbedded within the gripping end 214 of the rod handle 210. Alternatively, the spike 220 can be imbedded using adhesives, friction fit, or fasteners. An exposed axial portion 226 of the spike 220 extends or protrudes from the gripping end 214 of the handle 210. As noted previously, the spike 220 can also be fabricated from fiberglass or other man-made materials.

The compression spring 230 is disposed about the exposed axial portion 226 of the spike 220. The compression spring 230 has an extended length that is approximately equal to that of the exposed axial portion 226 of the spike 220.

Figure 11:
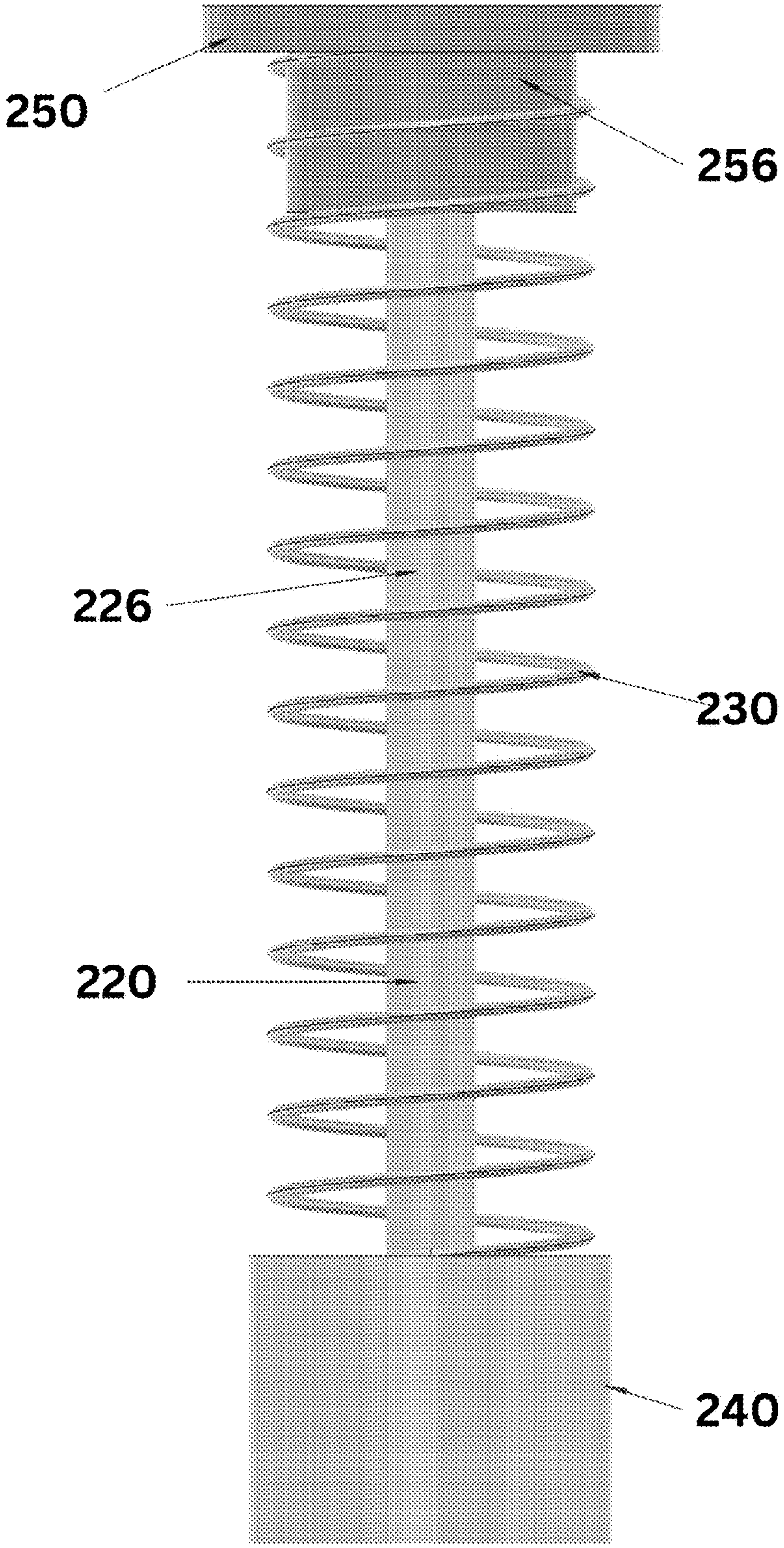
FIG. 11(*a*) is a partial elevational view of the handle of FIGS. 8-10, depicting the disposition of the compression spring about the “bumper” portion of the protective sleeve.
Figure 11:
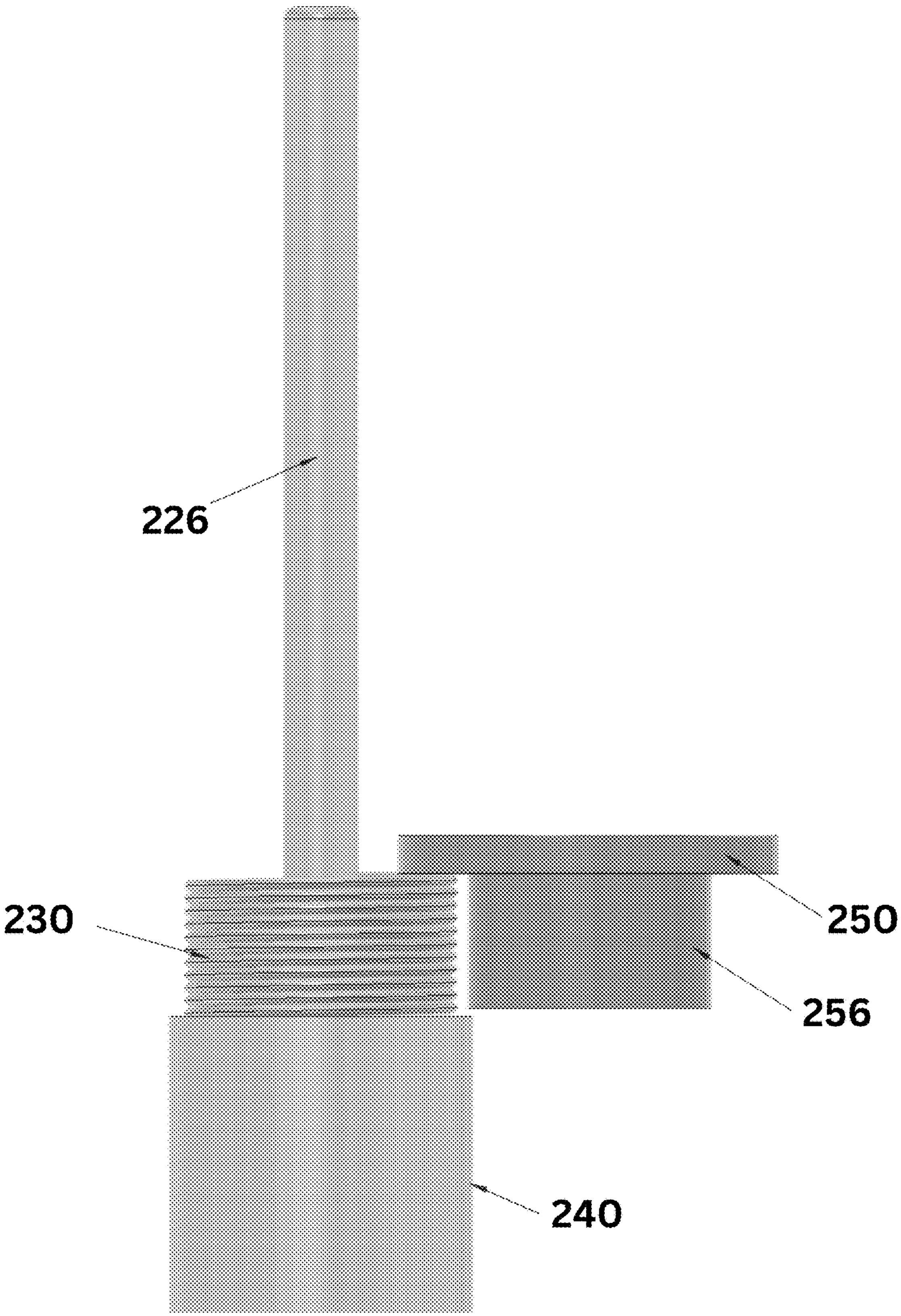
Figure 12:
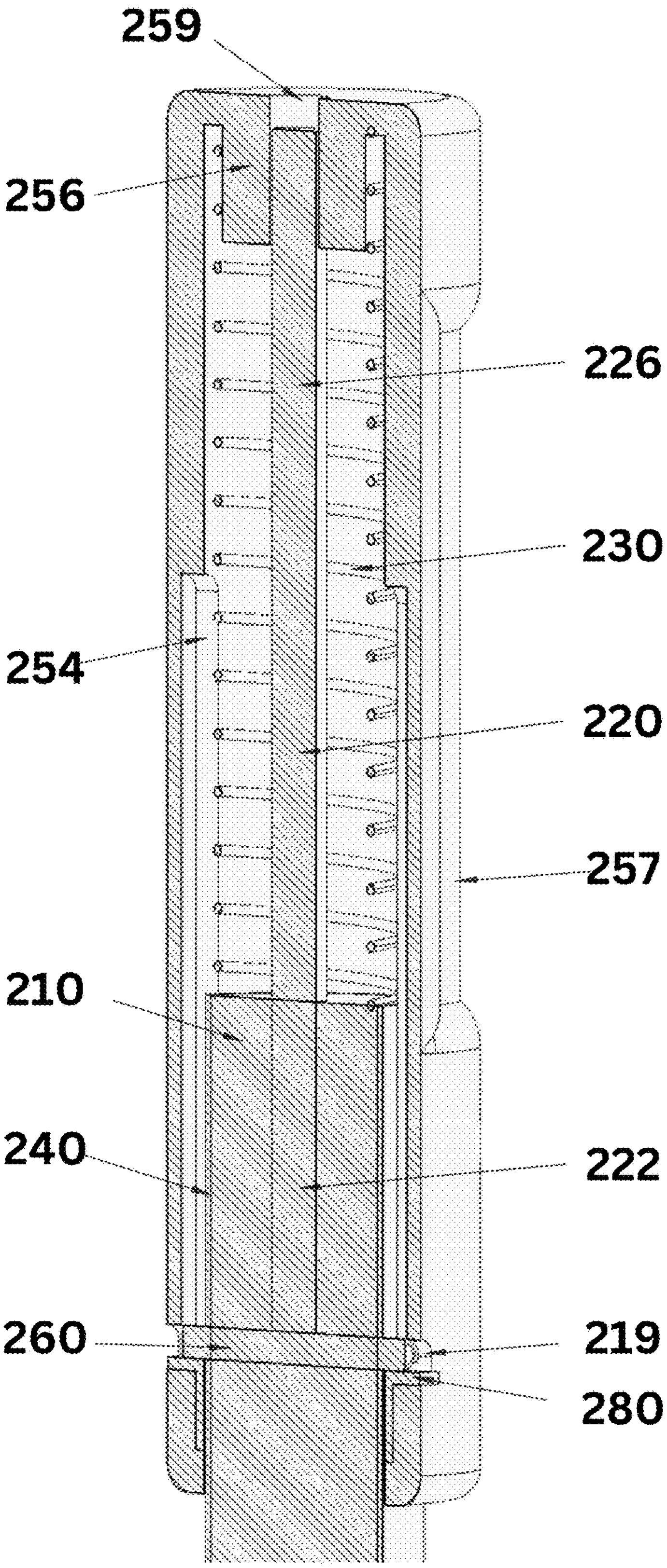
FIG. 12 is a front facing perspective view, taken in section of the handle of FIGS. 8-11(*b*)
Figure 13:
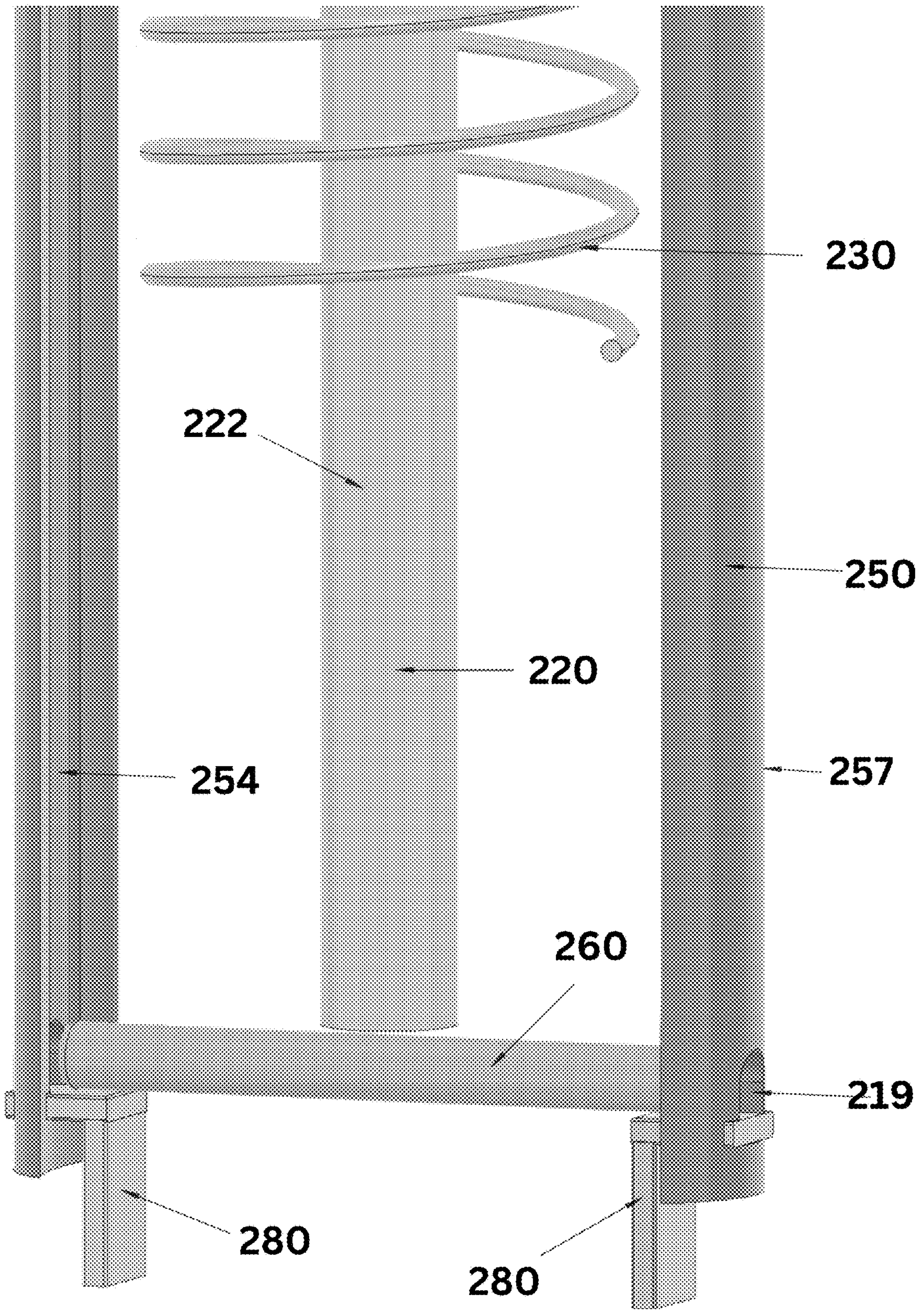
FIG. 13 is an enlarged view of the lower portion of the protective sleeve, showing the relative positions of the imbedded spike relative to the securing pin member and L-shaped supports.

According to this embodiment, the protective sleeve 250 is a unitary component that integrally incorporates a bumper or guard in an upper portion of the sleeve 250, which is substantially hollow. Rather than having a separate cap section as in the prior embodiment, the top or upper portion of the protective sleeve 250 is integral to the sleeve 250 and includes a through opening 259, as well as an internally reinforced portion 256, serving the purpose of a bumper or similar to the prior described embodiment. The formed bumper 256 is sized with an outer diameter that is sized to enable the compression spring 230 to be received thereabout during use, as shown in FIG. 11(*a*). Moreover, the length of the compression spring 230 in its fully compressed condition is slightly taller than the overall height dimension of the formed bumper, as shown in FIG. 11(*b*). For purposes of clarity, each of FIGS. 11(*a*) and 11(*b*) only show the top portion of the protective sleeve, including the integrally formed bumper 256 as a separate component. As previously discussed, the protective sleeve 250 can be formed with a cap portion that is attached to the remainder of the protective sleeve body or the cap portion can be integrated as part of a unitary sleeve.

As in the preceding embodiment, a pair of narrow longitudinal slots 254 are formed on diametrically opposite sides of the protective sleeve 250 to define the translational distance or range of movement of the handle 210 relative to the sleeve 250. The exterior of the protective sleeve 250 according to this exemplary embodiment further includes a plurality of gripping portions or ribs 257, each of which are disposed in spaced relation about the periphery. According to this embodiment, a total of four (4) ribs 257 are provided. The ribs 257 provide multiple functions. First, the ribs 257 aid in the gripability of the protective sleeve 250, which in typical use of the tool, would serve as the gripping handle for the user's hands. Additionally, a pair of the ribs 257 are used to shield/cover the narrow longitudinal slots 254. In the previously described prior version, the longitudinal slots 154, FIG. 5(*a*), were essentially open, enabling dirt and excess moisture to access the interior of the protective sleeve 150, FIG. 5(*a*). In addition, the open nature of the longitudinal slots 154, FIG. 5(*a*), of the prior embodiment also makes the user's hands prone to contact with the slots 154, as well as the securing pin member 160, FIG. 5(*a*), leading to discomfort for the user. Accordingly and as an improvement, two of the ribs 257 are herein configured to cover the slots 254, as well as the securing pin 260.

As shown in FIGS. 8-10, 12 and 13, a through hole 219 is formed in the rod handle 210 that is aligned with holes (not shown) formed on diametrically opposed sides of the ferrule 240, each of the holes being transverse or perpendicular to the longitudinal axis of the rod handle 210 and configured and sized to receive the securing pin member 260. The transverse hole 219 formed in the rod handle 210 is preferably disposed at a distance just below the depth of the threaded portion 222 of the imbedded spike 220, as best shown in the partial assembly view of FIG. 13.

According to this embodiment, a pair of L-shaped supports 280 are provided directly beneath the exposed ends of the pin member 260 within the lower portion of the protective sleeve 250, and more specifically directly adjacent to the lower end of each of the longitudinal slots 254. The L-shaped supports 280 are preferably made from steel or other suitable structural material and prevent the securing pin member 260 from otherwise degrading the protective sleeve 250 over time and use.

In terms of overall operation, a person using a tool including the herein described handle can prop that tool in an upright, or nearly upright/vertical orientation in seconds, provided a suitable substrate/ground surface, as previously described herein. is present nearby.

According to a preferred version, the tool or implement would be "flipped" or inverted 180 degrees with the gripping end 114, 214 of the handle 110, 210 in proximity of the substrate/ground surface. Then, using one or both hands, gripped at the midpoint or so of the rod handle 110, 210, one presses the protective sleeve 150, 250 down flat upon the substrate, and continues to apply downward force as the housed spring 130, 230 compresses and the protective sleeve 150, 250 telescopes up the rod handle 110, 210, while at the same time the spike 120, 220 is being incrementally exposed and driven into the substrate. This action continues until the spring 120, 220 reaches its fully compressed height (in some cases it might not fully reach this state due to obstacles present in the substrate, such as rocks, roots, or human artifacts of various descriptions), at which point the spike 120, 220 is fully embedded, and, assuming that sufficient friction exists between the spike 120, 220 and the various material constituents of the substrate, the tool is now securely propped.

In order to re-engage with the tool or implement, one simply grabs the rod handle 110, 210 at some point along its length and pulls upward, thus dislodging the exposed axial portion 126, 226 of the spike 120, 220 from the substrate. The compression spring 130, 230 is biased to revert to its original position, thereby allowing the spring-loaded protective sleeve 150, 250 to also revert axially to its original position with the sleeve 150, 250 again covering the spike 120, 220. Each of the foregoing occurs automatically in a matter of seconds upon retraction of the tool/implement handle from the substrate.

The use of this invention is limited to those work environments whereby the tool user is in close proximity to a substrate which has suitable physical properties that: a. first, allow the tool user to push the exposed spike 120, 220 into the substrate, using just his/her arm power, and b. second, provide sufficient friction between the exposed spike 120, 220 and the substrate, such that the spike 120, 220 does not pull back out of the substrate under the force of the compressed spring 130, 230 inside the protective sleeve 150, 250. Accordingly, the herein described invention is not intended for use with man-made surfaces such as wood floors, pavement and concrete, nor for work in natural rocky or gravelly substrates, or with compacted soil. The primary intended substrate or ground surfaces is ideally "softer" soils, such as those found in residential yards, vegetable gardens and perennial flower/shrub beds, although other substrates are also suitable in some circumstances, such as mulch, sawdust, and various manufacturing and processing residues/byproducts.

Figure 14:
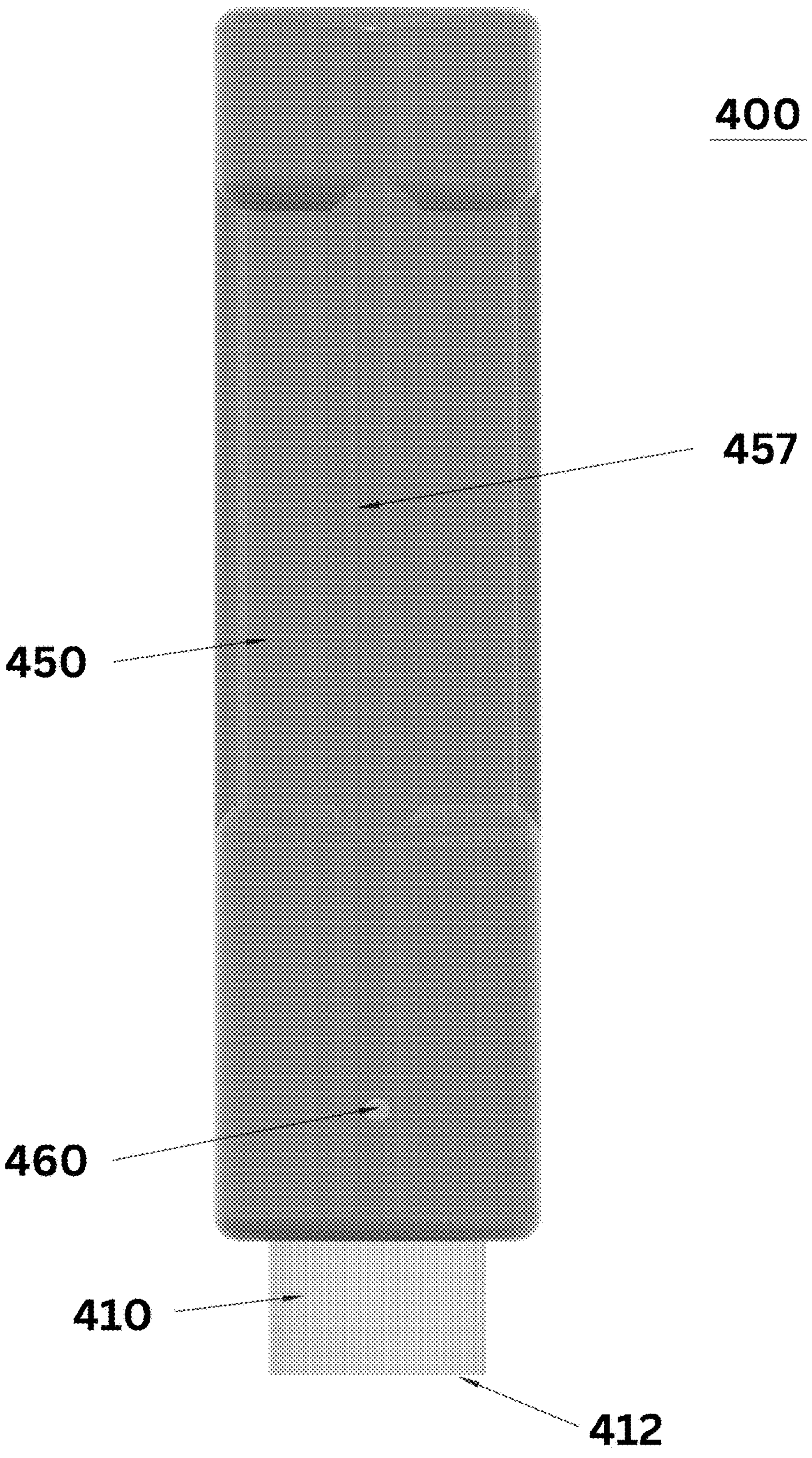
FIG. 14 is a side elevational view of a gripping handle for an implement made in accordance with a third embodiment of the invention.
Figure 15:
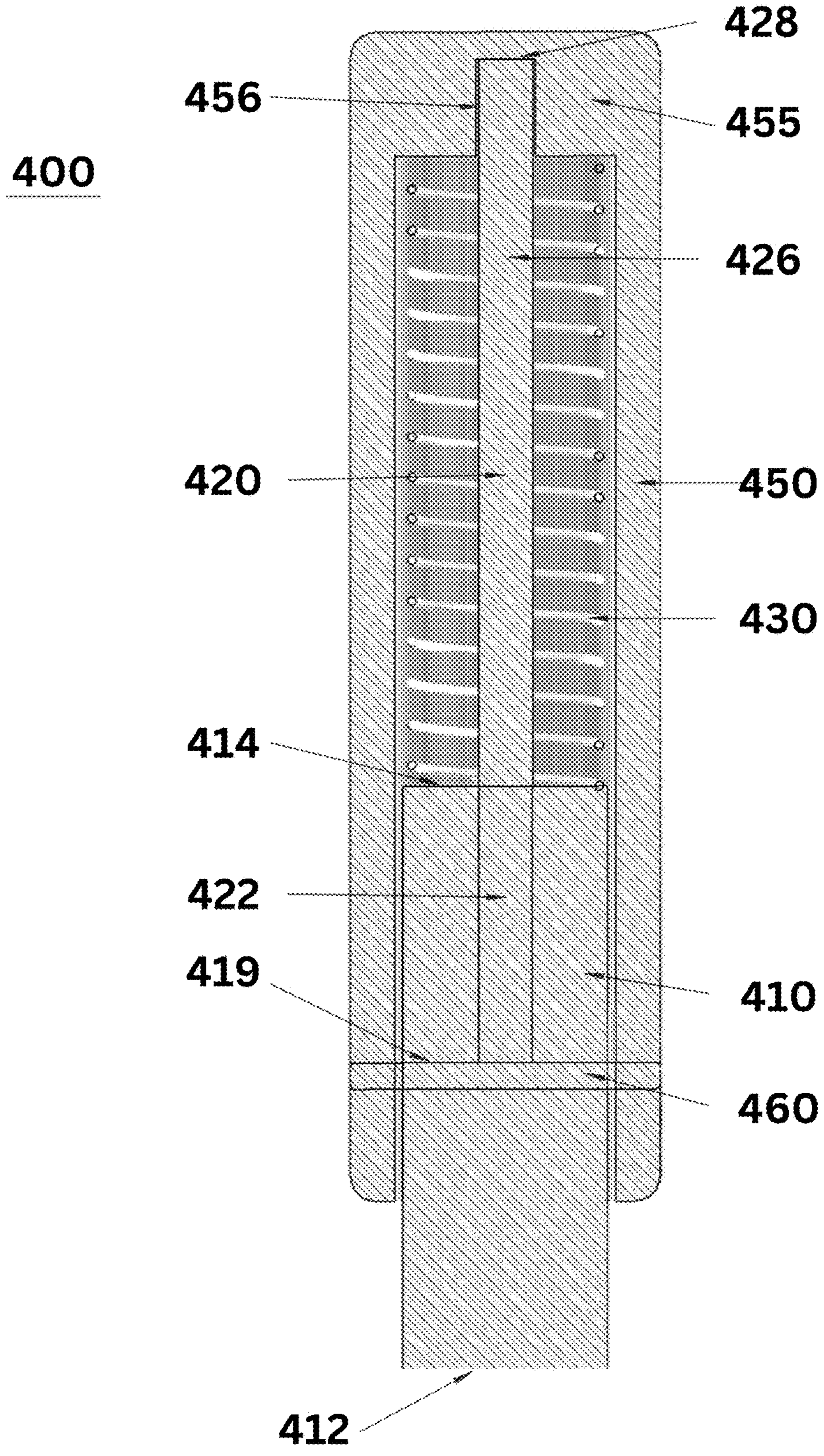
FIG. 15 is the side elevational view of the gripping handle of FIG. 14, shown in section.
Figure 16:
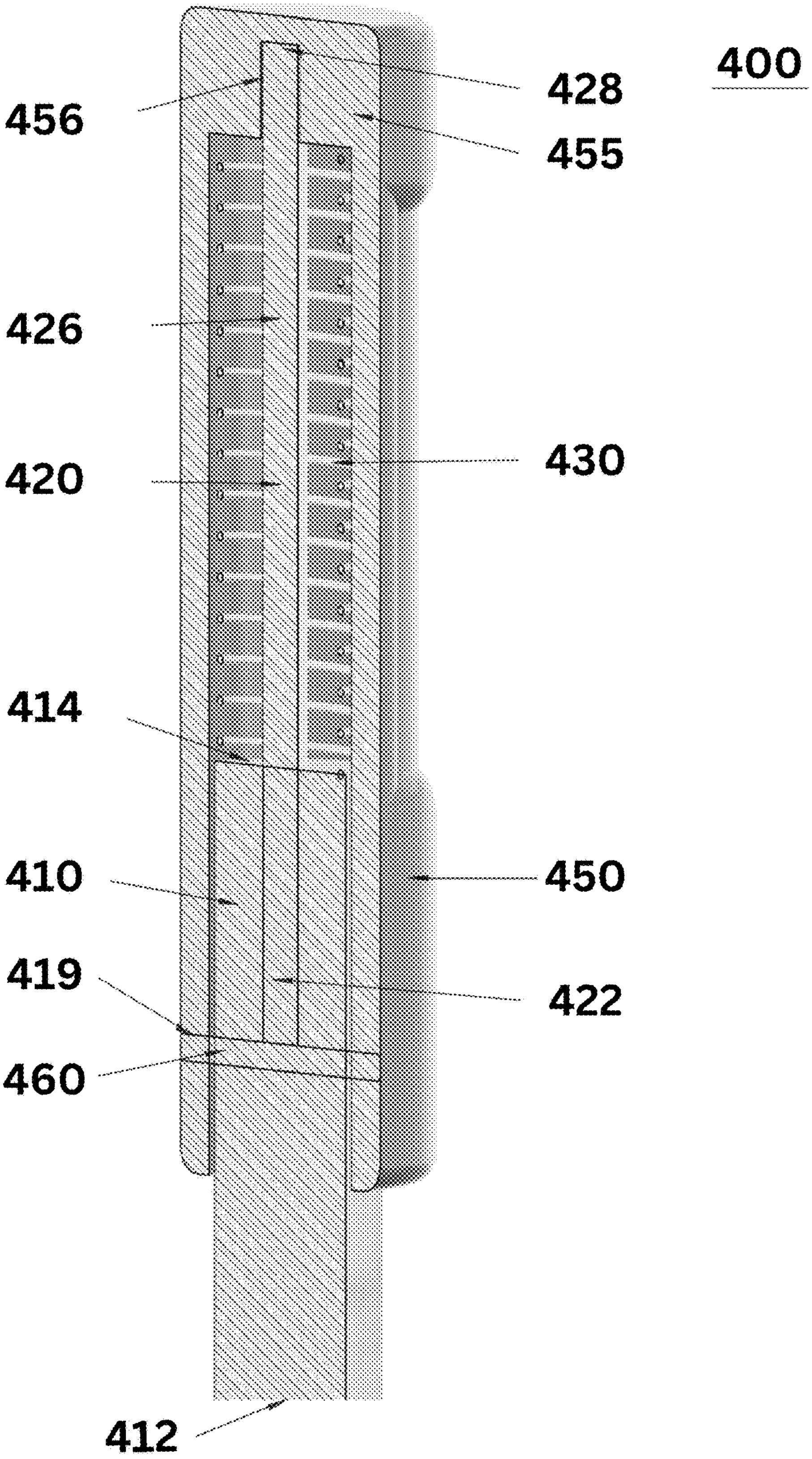
FIG. 16 is a front perspective view, shown in section, of the gripping handle of FIGS. 14 and 15.

The herein described gripping handle is also useful in implements, such as garden tools, that are not necessarily equipped for propping. With reference to FIGS. 14-16, there is shown a gripping handle 400 made in accordance with a third exemplary embodiment of the present invention. The gripping handle 400 includes the following major components, namely a rod handle 410, a spike 420, a compression spring 430, and a sleeve 450 which is fixedly attached to the rod handle 410 by a metal securing pin member 460.

The rod handle 410 is an elongate member having an implement end 412 (shown as truncated) and an opposing gripping end 414, which is the emphasis of this specific embodiment, and into which the spike 420 is imbedded to a predetermined distance, as shown, by an imbedded axial section 422. The rod handle 410 can be made from wood, fiberglass, plastic, composite or other suitable structural material, whether man-made or synthetic.

The spike 420 is preferably made from a rod of a hardened steel, but can also be made from other suitable materials wherein the spike 420 can be imbedded, for example, by providing the axial section 422 with threads. Alternatively, the spike 420 can be imbedded by other known means, such as a friction fit or by using fasteners, pins or adhesives to securely retain the axial section 422 within the gripping end 414 of the rod handle 410. An axial section 426 of the spike 420 protrudes upwardly as shown from the gripping end 414 of the rod handle 410.

A compression spring 430 is disposed about the protruding axial section 426 of the spike 420, the latter having a flattened distal end 428 that is supported in an upper portion 455 of the sleeve 450. The compression spring 430 has a diameter that is slightly smaller than a cavity defined in the sleeve 450, the spring 430 having an uncompressed length extending between a topmost surface of the rod handle 410 and an interior surface formed in the upper portion 455 of the sleeve 450. More specifically, the compression spring 230 is configured within the interior of the sleeve 450 such that contact between the topmost surface of the rod handle 410 and the interior surface formed on the upper portion 455 of the sleeve 450 is maintained.

The sleeve 450 is an essentially hollow component, preferably made from a plastic or preferably a soft rubber, having an open lower end with the sleeve 450 being fitted over an upper portion of the gripping end 414 of the rod handle 410, as well as the compression spring 430 and the axial extending portion 426 of the spike 420. The upper portion 455 of the sleeve 450 is closed and is defined by a thickened wall, the latter including a recess 456 into which the protruding axial section 422 of the spike 420 is received. Lateral walls of the sleeve 450 are also made sufficiently thick according to this specific embodiment, as compared to the prior described embodiments, and include a plurality of gripping portions or ribs 457 that are disposed at least over the exterior of a center section of the sleeve 450, the ribs 457 being disposed in spaced relation to one another about the outer periphery. Four (4) ribs 457 are provided according to this embodiment, but this number can be suitably varied.

A transverse hole 419 is provided in the rod handle 410 that accommodates the metal securing pin member 460, the latter having extending ends received in opposing diametrical sides of the sleeve 450. The transverse hole 419 is preferably disposed immediately below the lowermost end of the imbedded portion 422 of the spike 420. As such, the securing pin member 460 fixedly retains the sleeve 450 in place.

In use, a tool user is afforded a much improved tactile and functional experience, as compared to a traditional tool handle that is either completely bare or possesses merely a hard plastic or hard rubber grip at the non-working end of the tool. The soft rubber of the sleeve 450 provides a unique tactile sensation which is smooth to the touch but with a slightly grippy surface, making the tool easier to retain in the user's hands in use. This gripability is enhanced due to the presence of the ribs 457 located on the central portion of the sleeve 450, the central portion being that area where the user's hands typically contact the handle 400. Together, this creates a surer grip, especially in snowy or rainy conditions, or when the user's hands are sweaty. In addition, the rubber of the sleeve 450 is flexible and can be stretched, compressed and bent without breaking. Since the interior diameter of the rubber sleeve 450 is slightly larger than the outside diameter of the contained compression spring 430, the user can squeeze the sleeve 450, with the sleeve wall being able to compress and flex inwardly to the point that the interior wall surface of the sleeve 450 will contact the compression spring 430 at various points. In turn, the spring 430 will also be laterally compressed to a small extent given that the spring 430 is maintained within the sleeve 450 at its nearly extended condition, with the coils of the spring 430 being widely spaced from one another. Therefore, this handle 400 provides an improved grip for a tool handle in which the handle 400 is easily squeezed and compressed by a user, is comfortable due to its cushioning properties, and which offers gripping benefits making the herein described handle 400 more secure and easier to hold and control.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof "At least one of element A, element B, and element C" is not intended to be limited to at least one of an element A, at least one of an element B, and at least one of an element C.

This detailed description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated and in accordance with the following appended claims. Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

PARTS LIST FOR FIGS. 1-16

110 rod handle
112 implement end, rod handle
114 gripping end, rod handle

119 through hole, transverse
120 spike
122 imbedded portion, spike
124 end, spike
126 protruding or exposed axial portion, spike
130 compression spring
140 bumper or guard
144 through opening, bumper
150 protective sleeve
154 slots, longitudinal
158 cap portion
158A cap portion
158B cap portion
159 through opening, cap portion
160 securing pin member
210 rod handle
212 implement end, handle
214 gripping end, handle
219 transverse hole, handle
220 spike
222 threaded portion, spike
226 exposed axial portion, spike
230 compression spring
240 ferrule
250 protective sleeve
254 slots, longitudinal
256 reinforced portion, sleeve (bumper)
257 gripping portions or gripping ribs
259 through opening, sleeve/reinforced portion
260 securing pin member
280 L-shaped supports
400 gripping handle
410 rod handle
412 implement end, rod handle
414 gripping end, rod handle
419 transverse hole, rod handle
420 spike
422 imbedded axial portion, spike
426 protruding axial portion, spike
428 flattened distal end, spike
430 compression spring
450 sleeve
455 upper portion, sleeve
456 recess, upper portion
457 gripping portions or ribs
460 securing pin member It will be readily apparent that other modifications and variations can be made to the exemplary embodiments described and discussed herein which are within the intended scope of the invention and in accordance with the following claims.

I claim:

1. A handle configured to permit retention of an implement in a vertical or substantially vertical orientation within a ground surface or substrate when the implement is not in use, the handle comprising:

i) an elongate handle body having a gripping end and an opposing implement end that attaches to the implement;

ii) a spike embedded in the gripping end of the elongate handle body, the spike having an exposed axial portion;

iii) a compression spring disposed about the exposed axial portion of the spike;

iv) a hollow sleeve sized and adapted to be fitted over the compression spring and the gripping end of the elongate handle body, the hollow sleeve having an opening in an upper end sized to permit passage of the exposed axial portion of the spike, the hollow sleeve further including one or more longitudinal slots; and v) a pin member transversely disposed within the gripping end of the elongate handle body, the pin member having at least one end extending into the one or more longitudinal slots of the hollow sleeve, and wherein the hollow sleeve is movable axially between a first position in which the spike is wholly embedded in the gripping end and the hollow sleeve and a second position in which the exposed axial portion of the spike is advanced outwardly through the opening of the hollow sleeve for secure placement into the ground surface.

2. The handle according to claim 1, wherein the handle body is made from wood.

3. The handle according to claim 2, further comprising a metal ferrule disposed over the gripping end of the handle body.

4. The handle according to claim 1, wherein the handle body is made from at least one of steel, metal or metal alloys.

5. The handle according to claim 1, wherein the handle body is made from a durable plastic.

6. The handle according to claim 1, wherein the hollow sleeve is made from a durable plastic.

7. The handle according to claim 6, wherein the hollow sleeve is a gripping handle for the implement.

8. The handle according to claim 7, wherein the hollow sleeve further includes a plurality of ribs on the exterior of the sleeve, in which the ribs cover the one or more longitudinal slots.

9. The handle according to claim 8, wherein the hollow sleeve includes a pair of the longitudinal slots on diametrically opposed sides of the hollow sleeve for accommodating ends of the transversely mounted pin member.

10. The handle according to claim 9, further including one or more support members in the hollow sleeve adapted for contacting the ends of the transversely disposed pin member.

11. The handle according to claim 1, wherein the spike is imbedded to a predetermined distance within the gripping end of the handle body and the transversely mounted pin member is disposed beneath the imbedded spike.

12. The handle according to claim 11, wherein the spike is imbedded within the elongated handle body of the tool using at least one of a friction or interference fit, adhesives, pins or threadingly engaging the spike into the elongated handle body.

13. The handle according to claim 1, further comprising a bumper disposed in the hollow sleeve adjacent the opening.

14. The handle according to claim 13, wherein the hollow sleeve includes an upper cap portion having the opening sized to permit passage of the exposed portion of the spike.

15. The handle according to claim 14, wherein the cap portion is one of integral or separately mounted to the upper end of the hollow sleeve.

16. The handle according to claim 1, wherein the implement is a garden tool.

17. A method of manufacturing a handle for an implement enabling the implement to be propped in a substantially vertical orientation when the implement is not in use, the method comprising:

providing an elongate handle, the handle having a gripping end and an opposed implement end;

imbedding a spike within the gripping end of the elongated handle such that there is a predetermined axial exposed section of the spike extending therefrom;

disposing a compression spring about the exposed section of the spike;

providing a protective hollow sleeve over the compression spring and the gripping end of the elongate handle including the axial exposed section of the spike, the protective sleeve having an opening in an upper end sized to permit passage of the exposed portion of the spike, the hollow sleeve further including one or more longitudinal slots; and providing a pin member transversely disposed within the gripping end of the elongated handle body, the pin member having at least one end extending into the one or more longitudinal slots of the hollow sleeve, wherein the hollow sleeve is movable axially between a first position in which the spike is wholly imbedded in the gripping end and the hollow sleeve and a second position in which the axial exposed portion of the spike is outwardly advanced through the opening of the hollow sleeve for secure placement into the ground surface.

18. The method according to claim 17, further comprising the step of providing a bumper within an upper end of the protective hollow sleeve, the bumper having an opening aligned with the opening in the upper end of the sleeve to permit only the passage of the exposed portion of the spike.

19. The method according to claim 18, wherein the protective hollow sleeve is made from a durable plastic or rubber and in which the method further comprises the step of providing metal supports beneath ends of the pin member within a lower portion of the protective hollow sleeve.

20. The method according to claim 17, further comprising the step of providing one or more ribs on an exterior of the protective sleeve covering the one or more longitudinal slots and to prevent dirt and moisture to access the interior of the protective sleeve.

* * * * *